(12) United States Patent
Tsai

(10) Patent No.: US 10,445,547 B2
(45) Date of Patent: Oct. 15, 2019

(54) DEVICE MOUNTABLE PACKAGING OF ULTRASONIC TRANSDUCERS

(71) Applicant: InvenSense, Inc., San Jose, CA (US)

(72) Inventor: Julius Ming-Lin Tsai, San Jose, CA (US)

(73) Assignee: InvenSense, Inc., San Jose, CA (US)

( * ) Notice: Subject to any disclaimer, the term of this patent is extended or adjusted under 35 U.S.C. 154(b) by 293 days.

(21) Appl. No.: 15/415,716

(22) Filed: Jan. 25, 2017

(65) Prior Publication Data

US 2017/0323133 A1 Nov. 9, 2017

Related U.S. Application Data

(60) Provisional application No. 62/331,919, filed on May 4, 2016, provisional application No. 62/334,404, filed on May 10, 2016.

(51) Int. Cl.
| | |
|---|---|
| *G06K 9/00* | (2006.01) |
| *B06B 1/06* | (2006.01) |
| *B06B 1/02* | (2006.01) |
| *G10K 9/00* | (2006.01) |
| *G10K 11/30* | (2006.01) |

(52) U.S. Cl.
CPC .......... *G06K 9/0002* (2013.01); *B06B 1/0292* (2013.01); *B06B 1/06* (2013.01); *B06B 1/0622* (2013.01); *G10K 11/30* (2013.01); *G06K 9/0008* (2013.01)

(58) Field of Classification Search
CPC .. G06K 9/0002; G06K 9/0008; B06B 1/0622; B06B 1/0292; B06B 1/06; G10K 11/30
See application file for complete search history.

(56) References Cited

U.S. PATENT DOCUMENTS

| | | |
|---|---|---|
| 5,575,286 A | 11/1996 | Weng et al. |
| 5,684,243 A | 11/1997 | Gururaja et al. |
| 5,808,967 A | 9/1998 | Yu et al. |
| 5,867,302 A | 2/1999 | Fleming |
| 6,071,239 A | 6/2000 | Cribbs et al. |
| 6,289,112 B1 | 9/2001 | Jain et al. |
| 6,350,652 B1 | 2/2002 | Libera et al. |
| 6,428,477 B1 | 8/2002 | Mason et al. |
| 6,500,120 B1 | 12/2002 | Anthony |
| 6,676,602 B1 | 1/2004 | Barnes et al. |
| 6,736,779 B1 | 5/2004 | Sano et al. |

(Continued)

FOREIGN PATENT DOCUMENTS

| | | |
|---|---|---|
| EP | 1214909 A1 | 6/2002 |
| EP | 2884301 A1 | 6/2015 |

(Continued)

OTHER PUBLICATIONS

ZTE V7 MAX. 5,5" smartphone on MediaTeck Helio P10 cpu; Published on Apr 20, 2016; https://www.youtube.com/watch?v=ncNCbpkGQzU (Year: 2016).*

(Continued)

*Primary Examiner* — Daniel Pihulic

(57) ABSTRACT

An electronic device including an array of ultrasonic transducers for generating and receiving ultrasonic signals, and an acoustic coupling layer overlying the array of ultrasonic transducers, where the ultrasonic signals are propagated through the acoustic coupling layer.

23 Claims, 15 Drawing Sheets

(56) References Cited

U.S. PATENT DOCUMENTS

| | | |
|---|---|---|
| 7,067,962 B2 | 6/2006 | Scott |
| 7,109,642 B2 | 9/2006 | Scott |
| 7,243,547 B2 | 7/2007 | Cobianu et al. |
| 7,400,750 B2 | 7/2008 | Nam |
| 7,459,836 B2 | 12/2008 | Scott |
| 7,471,034 B2 | 12/2008 | Schlote-Holubek et al. |
| 7,489,066 B2 | 2/2009 | Scott et al. |
| 7,739,912 B2 | 6/2010 | Schneider et al. |
| 8,018,010 B2 | 9/2011 | Tigli et al. |
| 8,139,827 B2 | 3/2012 | Schneider et al. |
| 8,311,514 B2 | 11/2012 | Bandyopadhyay et al. |
| 8,335,356 B2 | 12/2012 | Schmitt |
| 8,433,110 B2 | 4/2013 | Kropp et al. |
| 8,508,103 B2 | 8/2013 | Schmitt et al. |
| 8,515,135 B2 | 8/2013 | Clarke et al. |
| 8,666,126 B2 | 3/2014 | Lee et al. |
| 8,703,040 B2 | 4/2014 | Liufu et al. |
| 8,723,399 B2 | 5/2014 | Sammoura et al. |
| 8,805,031 B2 | 8/2014 | Schmitt |
| 9,056,082 B2 | 6/2015 | Liautaud et al. |
| 9,070,861 B2 | 6/2015 | Bibl et al. |
| 9,224,030 B2 | 12/2015 | Du et al. |
| 9,245,165 B2 | 1/2016 | Slaby et al. |
| 9,424,456 B1 | 8/2016 | Kamath Koteshwara et al. |
| 9,572,549 B2 | 2/2017 | Belevich et al. |
| 9,582,102 B2 | 2/2017 | Setlak |
| 9,607,203 B1 | 3/2017 | Yazdandoost et al. |
| 9,607,206 B2 | 3/2017 | Schmitt et al. |
| 9,613,246 B1 | 4/2017 | Gozzini et al. |
| 9,665,763 B2 | 5/2017 | Du et al. |
| 9,747,488 B2 | 8/2017 | Yazdandoost et al. |
| 9,785,819 B1 | 10/2017 | Oreifej |
| 9,815,087 B2 | 11/2017 | Ganti et al. |
| 9,817,108 B2 | 11/2017 | Kuo et al. |
| 9,818,020 B2 | 11/2017 | Schuckers et al. |
| 9,881,195 B2 | 1/2018 | Lee et al. |
| 9,881,198 B2 | 1/2018 | Lee et al. |
| 9,898,640 B2 | 2/2018 | Ghavanini |
| 9,904,836 B2 | 2/2018 | Peke Yazdandoost et al. |
| 9,909,225 B2 | 3/2018 | Lee et al. |
| 9,922,235 B2 | 3/2018 | Cho et al. |
| 9,934,371 B2 | 4/2018 | Hong et al. |
| 9,939,972 B2 | 4/2018 | Shepelev et al. |
| 9,953,205 B1 | 4/2018 | Rasmussen et al. |
| 9,959,444 B2 | 5/2018 | Young et al. |
| 9,967,100 B2 | 5/2018 | Hong et al. |
| 9,983,656 B2 | 5/2018 | Merrell et al. |
| 9,984,271 B1 | 5/2018 | King et al. |
| 10,275,638 B1 | 4/2019 | Yousefpor et al. |
| 10,315,222 B2 | 6/2019 | Salvia et al. |
| 2002/0135273 A1 | 9/2002 | Mauchamp et al. |
| 2003/0013955 A1 | 1/2003 | Poland |
| 2004/0085858 A1 | 5/2004 | Khuri-Yakub et al. |
| 2004/0122316 A1 | 6/2004 | Satoh et al. |
| 2004/0174773 A1 | 9/2004 | Thomenius et al. |
| 2005/0057284 A1 | 3/2005 | Wodnicki |
| 2005/0110071 A1 | 5/2005 | Ema et al. |
| 2005/0146240 A1 | 7/2005 | Smith et al. |
| 2005/0148132 A1 | 7/2005 | Wodnicki et al. |
| 2005/0162040 A1 | 7/2005 | Robert |
| 2006/0052697 A1 | 3/2006 | Hossack et al. |
| 2006/0079777 A1 | 4/2006 | Karasawa |
| 2007/0046396 A1 | 3/2007 | Huang |
| 2007/0073135 A1 | 3/2007 | Lee et al. |
| 2007/0202252 A1 | 8/2007 | Sasaki |
| 2007/0215964 A1 | 9/2007 | Khuri-Yakub et al. |
| 2007/0230754 A1 | 10/2007 | Jain et al. |
| 2008/0125660 A1 | 5/2008 | Yao et al. |
| 2008/0150032 A1 | 6/2008 | Tanaka |
| 2008/0194053 A1 | 8/2008 | Huang |
| 2009/0005684 A1 | 1/2009 | Kristoffersen et al. |
| 2009/0182237 A1 | 7/2009 | Angelsen et al. |
| 2009/0274343 A1 | 11/2009 | Clarke |
| 2009/0303838 A1 | 12/2009 | Svet |
| 2010/0030076 A1 | 2/2010 | Vortman et al. |
| 2010/0168583 A1 | 7/2010 | Dausch et al. |
| 2010/0195851 A1 | 8/2010 | Buccafusca |
| 2010/0201222 A1 | 8/2010 | Adachi et al. |
| 2010/0202254 A1 | 8/2010 | Roest et al. |
| 2010/0239751 A1 | 9/2010 | Regniere |
| 2010/0251824 A1 | 10/2010 | Schneider et al. |
| 2010/0256498 A1 | 10/2010 | Tanaka |
| 2010/0278008 A1 | 11/2010 | Ammar |
| 2011/0285244 A1 | 11/2011 | Lewis et al. |
| 2011/0291207 A1 | 12/2011 | Martin et al. |
| 2012/0016604 A1 | 1/2012 | Irving et al. |
| 2012/0092026 A1 | 4/2012 | Liautaud et al. |
| 2012/0095347 A1 | 4/2012 | Adam et al. |
| 2012/0147698 A1 | 6/2012 | Wong et al. |
| 2012/0232396 A1 | 9/2012 | Tanabe |
| 2012/0238876 A1 | 9/2012 | Tanabe et al. |
| 2012/0279865 A1 | 11/2012 | Regniere et al. |
| 2012/0288641 A1 | 11/2012 | Diatezua et al. |
| 2013/0051179 A1 | 2/2013 | Hong |
| 2013/0064043 A1 | 3/2013 | Degertekin et al. |
| 2013/0127592 A1 | 5/2013 | Fyke et al. |
| 2013/0133428 A1 | 5/2013 | Lee et al. |
| 2013/0201134 A1 | 8/2013 | Schneider et al. |
| 2013/0294202 A1 | 11/2013 | Hajati |
| 2014/0060196 A1 | 3/2014 | Falter et al. |
| 2014/0117812 A1 | 5/2014 | Hajati |
| 2014/0176332 A1 | 6/2014 | Alameh et al. |
| 2014/0208853 A1 | 7/2014 | Onishi et al. |
| 2014/0219521 A1 | 8/2014 | Schmitt et al. |
| 2014/0232241 A1 | 8/2014 | Hajati |
| 2014/0265721 A1 | 9/2014 | Robinson et al. |
| 2014/0355387 A1 | 12/2014 | Kitchens et al. |
| 2015/0036065 A1 | 2/2015 | Yousefpor et al. |
| 2015/0087991 A1 | 3/2015 | Chen et al. |
| 2015/0097468 A1 | 4/2015 | Hajati et al. |
| 2015/0145374 A1 | 5/2015 | Xu et al. |
| 2015/0164473 A1 | 6/2015 | Kim et al. |
| 2015/0165479 A1* | 6/2015 | Lasiter .............. B06B 1/0666 310/322 |
| 2015/0169136 A1 | 6/2015 | Ganti et al. |
| 2015/0189136 A1 | 7/2015 | Chung et al. |
| 2015/0198699 A1 | 7/2015 | Kuo et al. |
| 2015/0206738 A1 | 7/2015 | Rastegar |
| 2015/0213180 A1 | 7/2015 | Herberholz |
| 2015/0220767 A1 | 8/2015 | Yoon et al. |
| 2015/0261261 A1 | 9/2015 | Bhagavatula et al. |
| 2015/0286312 A1 | 10/2015 | Kang et al. |
| 2015/0345987 A1 | 12/2015 | Hajati |
| 2016/0051225 A1 | 2/2016 | Kim et al. |
| 2016/0063294 A1 | 3/2016 | Du et al. |
| 2016/0086010 A1 | 3/2016 | Merrell et al. |
| 2016/0092716 A1 | 3/2016 | Yazdandoost et al. |
| 2016/0100822 A1 | 4/2016 | Kim et al. |
| 2016/0107194 A1 | 4/2016 | Panchawagh et al. |
| 2016/0326477 A1 | 11/2016 | Fernandez-Alcon et al. |
| 2017/0330552 A1 | 1/2017 | Garlepp et al. |
| 2017/0075700 A1 | 3/2017 | Abudi et al. |
| 2017/0100091 A1 | 4/2017 | Eigil et al. |
| 2017/0110504 A1 | 4/2017 | Panchawagh et al. |
| 2017/0119343 A1 | 5/2017 | Pintoffl |
| 2017/0168543 A1 | 6/2017 | Dai et al. |
| 2017/0219536 A1 | 8/2017 | Koch et al. |
| 2017/0231534 A1 | 8/2017 | Agassy et al. |
| 2017/0293791 A1 | 10/2017 | Mainguet et al. |
| 2017/0322290 A1 | 11/2017 | Ng |
| 2017/0322291 A1 | 11/2017 | Salvia et al. |
| 2017/0322292 A1 | 11/2017 | Salvia et al. |
| 2017/0322305 A1 | 11/2017 | Apte et al. |
| 2017/0323133 A1* | 11/2017 | Tsai ..................... B06B 1/0292 |
| 2017/0326590 A1 | 11/2017 | Daneman |
| 2017/0326591 A1 | 11/2017 | Apte et al. |
| 2017/0326593 A1 | 11/2017 | Garlepp et al. |
| 2017/0326594 A1 | 11/2017 | Berger et al. |
| 2017/0328866 A1 | 11/2017 | Apte et al. |
| 2017/0328870 A1 | 11/2017 | Garlepp et al. |
| 2017/0330012 A1 | 11/2017 | Salvia et al. |
| 2017/0330553 A1 | 11/2017 | Garlepp et al. |
| 2017/0357839 A1 | 12/2017 | Yazdandoost et al. |
| 2018/0206820 A1 | 7/2018 | Anand et al. |

(56) References Cited

U.S. PATENT DOCUMENTS

| | | |
|---|---|---|
| 2018/0349663 A1 | 12/2018 | Garlepp et al. |
| 2018/0357457 A1 | 12/2018 | Rasmussen et al. |
| 2018/0369866 A1 | 12/2018 | Sammoura et al. |
| 2019/0005300 A1 | 1/2019 | Garlepp et al. |
| 2019/0102046 A1 | 4/2019 | Miranto et al. |

FOREIGN PATENT DOCUMENTS

| | | | |
|---|---|---|---|
| JP | 2011040467 A | 2/2011 | |
| WO | 2009096576 A2 | 8/2009 | |
| WO | 2009137106 A2 | 11/2009 | |
| WO | 2014035564 A1 | 3/2014 | |
| WO | 2015009635 A1 | 1/2015 | |
| WO | 2015112453 A1 | 7/2015 | |
| WO | 2015120132 A1 | 8/2015 | |
| WO | 2015131083 A1 | 9/2015 | |
| WO | 2015183945 A1 | 12/2015 | |
| WO | 2016007250 A1 | 1/2016 | |
| WO | 2016011172 A1 | 1/2016 | |
| WO | 2016040333 A2 | 3/2016 | |
| WO | 2017003848 A1 | 1/2017 | |
| WO | 2017192895 A1 | 11/2017 | |
| WO | 2017196678 A1 | 11/2017 | |
| WO | 2017196682 A1 | 11/2017 | |
| WO | WO-2017192903 A3 * | 12/2017 | ........... B06B 1/0292 |

OTHER PUBLICATIONS

Tang, et al., "Pulse-Echo Ultrasonic Fingerprint Sensor on a Chip", IEEE Transducers, Anchorage, Alaska, USA, Jun. 21-25, 2015, pp. 674-677.

Dausch, et al., "Theory and Operation of 2-D Array Piezoelectric Micromachined Ultrasound Transducers", IEEE Transactions on Ultrasonics, and Frequency Control, vol. 55, No. 11;, Nov. 2008, 2484-2492.

Hopcroft, et al., "Temperature Compensation of a MEMS Resonator Using Quality Factor as a Thermometer", Retrieved from Internet: http://micromachine.stanford.edu/~amanu/linked/MAH_MEMS2006.pdf, 2006, 222-225.

Hopcroft, et al., "Using the temperature dependence of resonator quality factor as a thermometer", Applied Physics Letters 91. Retrieved from Internet: http://micromachine.stanford.edu/~hopcroft/Publications/Hopcroft_QT_ApplPhysLett_91_013505.pdf, 2007, 013505-1-031505-3.

Lee, et al., "Low jitter and temperature stable MEMS oscillators", Frequency Control Symposium (FCS), 2012 IEEE International, May 2012, 1-5.

Li, et al., "Capacitive micromachined ultrasonic transducer for ultra-low pressure measurement: Theoretical study", AIP Advances 5.12. Retrieved from Internet: http://scitation.aip.org/content/aip/journal/adva/5/12/10.1063/1.4939217, 2015, 127231.

Qiu, et al., "Piezoelectric Micromachined Ultrasound Transducer (PMUT) Arrays for Integrated Sensing, Actuation and Imaging", Sensors 15, doi:10.3390/s150408020, Apr. 3, 2015, 8020-8041.

Savoia, et al., "Design and Fabrication of a cMUT Probe for Ultrasound Imaging of Fingerprints", 2010 IEEE International Ultrasonics Symposium Proceedings, Oct. 2010, 1877-1880.

Shen, et al., "Anisotropic Complementary Acoustic Metamaterial for Canceling out Aberrating Layers", American Physical Society, Physical Review X 4.4: 041033., Nov. 19, 2014, 041033-1-041033-7.

Thakar, et al., "Multi-resonator approach to eliminating the temperature dependence of silicon-based timing references", Hilton Head'14. Retrieved from the Internet: http://blog.narotama.ac.id/wp-content/uploads/2014/12/Multi-resonator-approach-to-eliminating-the-temperature-dependance-of-silicon-based-timing-references.pdf, 2014, 415-418.

ISA/EP, International Search Report and Written Opinion for International Application No. PCT/US2017/031120, 12 pages, dated Aug. 29, 2017 (Aug. 29, 2017).

ISA/EP, International Search Report and Written Opinion for International Application No. PCT/US2017/031120, 13 pages, dated Sep. 1, 2017 (Sep. 1, 2017).

ISA/EP, International Search Report and Written Opinion for International Application No. PCT/US2017/031134, 12 pages, dated Aug. 30, 2017 (Aug. 30, 2017).

ISA/EP, International Search Report and Written Opinion for International Application No. PCT/US2017/031421 13 pages, dated Jun. 21, 2017 (Jun. 21, 2017).

ISA/EP, International Search Report and Written Opinion for International Application No. PCT/US2017/031426 13 pages, dated Jun. 22, 2017 (Jun. 22, 2017).

ISA/EP, International Search Report and Written Opinion for International Application No. PCT/US2017/031431, 14 pages, dated Aug. 1, 2017 (Aug. 1, 2017).

ISA/EP, International Search Report and Written Opinion for International Application No. PCT/US2017/031434, 13 pages, dated Jun. 26, 2017 (Jun. 26, 2017).

ISA/EP, International Search Report and Written Opinion for International Application No. PCT/US2017/031439, 10 pages, dated Jun. 20, 2017 (Jun. 20, 2017).

ISA/EP, International Search Report and Written Opinion for International Application No. PCT/US2017/031824, 18 pages, dated Sep. 22, 2017 (Sep. 22, 2017).

ISA/EP, International Search Report and Written Opinion for International Application No. PCT/US2017/031827, 16 pages, dated Aug. 1, 2017 (Aug. 1, 2017).

ISA/EP, International Search Report and Written Opinion for International Application No. PCT/US2017/031831, 12 pages, dated Jul. 21, 2017 (Jul. 21, 2017).

ISA/EP, Partial International Search Report for International Application No. PCT/US2017/031140, 13 pages, dated Aug. 29, 2017 (Aug. 29, 2017).

Rozen, et al., "Air-Coupled Aluminum Nitride Piezoelectric Micromachined Ultrasonic Transducers at 0.3 Mhz to 0.9 Mhz", 2015 28th IEEE International Conference on Micro Electro Mechanical Systems (MEMS), IEEE, Jan. 18, 2015, 921-924.

ISA/EP, International Search Report and Written Opinion for International Application No. PCT/US2017/031140, 18 pages, dated Nov. 2, 2017 (Nov. 2, 2017).

ISA/EP, International Search Report for International Application No. PCT/US2017/031826, 16 pages, dated Feb. 27, 2018 (Feb. 27, 2018).

ISA/EP, Partial International Search Report for International Application No. PCT/US2017/031823, 12 pages, dated Nov. 30, 2017 (Nov. 30, 2017).

"ISA/EP, International Search Report and Written Opinion for International Application # PCT/US2018/063431, pp. 1-15, dated Feb. 5, 2019 (Feb. 5, 2019))".

"Moving Average Filters", Waybackmachine XP05547422, Retrieved from the Internet: URL:https://web.archive.org/web/20170809081353/https//www.analog.com/media/en/technical-documentation/dsp-book/dsp_book_Ch15.pdf [retrieved on Jan. 24, 2019], Aug. 9, 2017, 1-8.

"Receiver Thermal Noise Threshold", Fisher Telecommunication Services, Satellite Communications. Retrieved from the Internet: URL:https://web.archive.org/web/20171027075705/http//www.fishercom.xyz:80/satellite-communications/receiver-thermal-noise-threshold.html, Oct. 27, 2017, 3.

"Sleep Mode", Wikipedia, Retrieved from the Internet: URL:https://web.archive.org/web/20170908153323/https://en.wikipedia.org/wiki/Sleep_mode [retrieved on Jan. 25, 2019], Sep. 8, 2017, 1-3.

"TMS320C5515 Fingerprint Development Kit (FDK) Hardware Guide", Texas Instruments, Literature No. SPRUFX3, XP055547651, Apr. 2010, 1-26.

ISA/EP, International Search Report and Written Opinion for International Application # PCT/US2019/015020, pp. 1-23, dated Jul. 1, 2019.

ISA/EP, International Search Report and Written Opinion for International Application # PCT/US2019/023440, pp. 1-10, dated Jun. 4, 2019.

(56) References Cited

OTHER PUBLICATIONS

Cappelli, et al., "Fingerprint Image Reconstruction from Standard Templates", IEEE Transactions on Pattern Analysis and Machine Intelligence, IEEE Computer Society, vol. 29, No. 9, Sep. 2007, 1489-1503.
Feng, et al., "Fingerprint Reconstruction: From Minutiae to Phase", IEEE Transactions on Pattern Analysi and Machine Intelligence, IEEE Computer Society, vol. 33, No. 2, Feb. 2011, 209-223.
Kumar, et al., "Towards Contactless, Low-Cost and Accurate 3D Fingerprint Identification", IEEE Transactions on Pattern Analysis and Machine Intelligence, IEEE Computer Society, vol. 37, No. 3, Mar. 2015, 681-696.
Pang, et al., "Extracting Valley-Ridge Lines from Point-Cloud-Based 3D Fingerprint Models", IEEE Computer Graphics and Applications, IEEE Service Center, New York, vol. 33, No. 4, Jul./Aug. 2013, 73-81.
Ross, et al., "From Template to Image: Reconstructing Fingerprints from Minutiae Points", IEEE Transactions Dn Pattern Analysis and Machine Intelligence, IEEE Computer Society, vol. 29, No. 4, Apr. 2007, 544-560.
Zhou, et al., "Partial Fingerprint Reconstruction with Improved Smooth Extension", Network and System Security, Springer Berlin Heidelberg, Jun. 3, 2013, 756-762.

\* cited by examiner

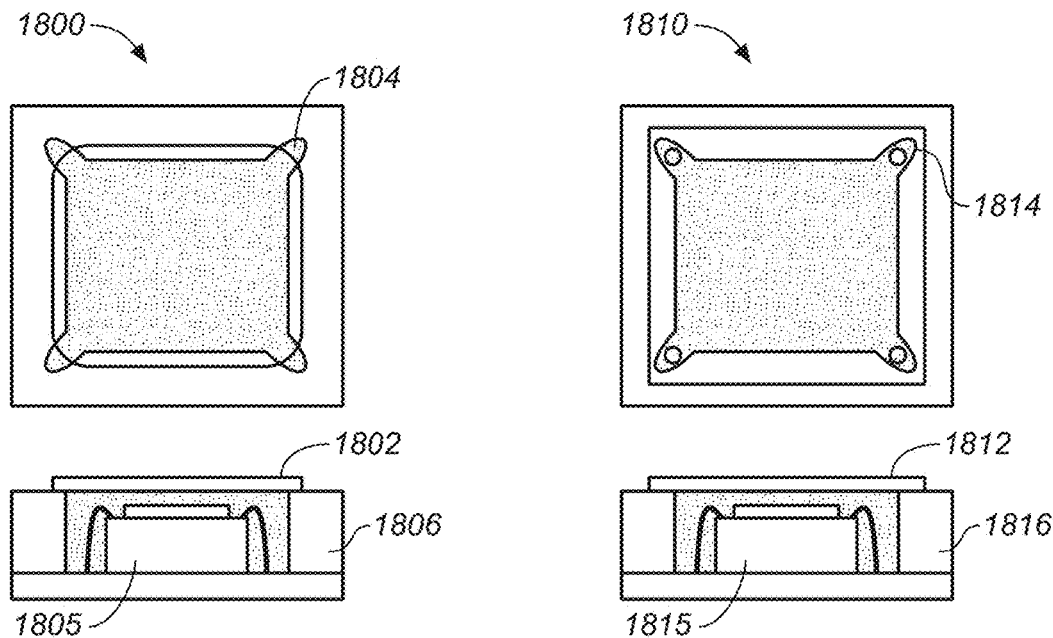
FIG. 18A
FIG. 18B
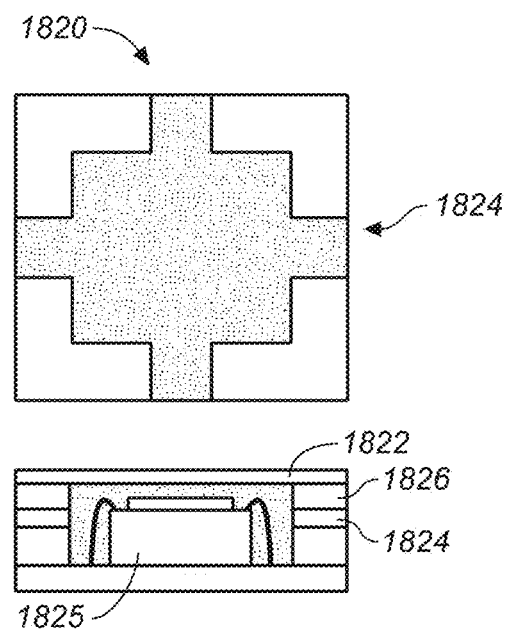
FIG. 18C

DEVICE MOUNTABLE PACKAGING OF ULTRASONIC TRANSDUCERS

RELATED APPLICATIONS

This application claims priority to and the benefit of U.S. Patent Provisional Patent Application 62/331,919, filed on May 4, 2016, entitled "PINNED ULTRASONIC TRANSDUCERS," by Ng et al., and assigned to the assignee of the present application, which is incorporated herein by reference in its entirety.

This application also claims priority to and the benefit of U.S. Provisional Patent Application 62/334,404, filed on May 10, 2016, entitled "EDGE MOUNTABLE PACKAGING OF ULTRASONIC TRANSDUCERS," by Tsai, and assigned to the assignee of the present application, which is incorporated herein by reference in its entirety.

BACKGROUND

Conventional fingerprint sensing solutions are available and deployed in consumer products, such as smartphones and other type of mobile devices. Common fingerprint sensor technologies generally rely on (1) a sensor and (2) a processing element. When the sensor is turned on, the sensor can take or can direct the device to take an image, which is digitized (e.g., level of brightness is encoded into a digital format), and send the image to the processing element. However, finger print sensors typically consume substantial amount of power (e.g., hundreds of μ Watts to several mWatts) and, therefore, may present a considerable drain on power resources of the mobile device by rapidly draining the battery of the mobile device.

BRIEF DESCRIPTION OF THE DRAWINGS

The accompanying drawings, which are incorporated in and form a part of the Description of Embodiments, illustrate various embodiments of the subject matter and, together with the Description of Embodiments, serve to explain principles of the subject matter discussed below. Unless specifically noted, the drawings referred to in this Brief Description of Drawings should be understood as not being drawn to scale. Herein, like items are labeled with like item numbers.

FIGS. 18A-C illustrate example packaging configurations including relief mechanisms, in accordance with various embodiments.

DESCRIPTION OF EMBODIMENTS

Figure 1:
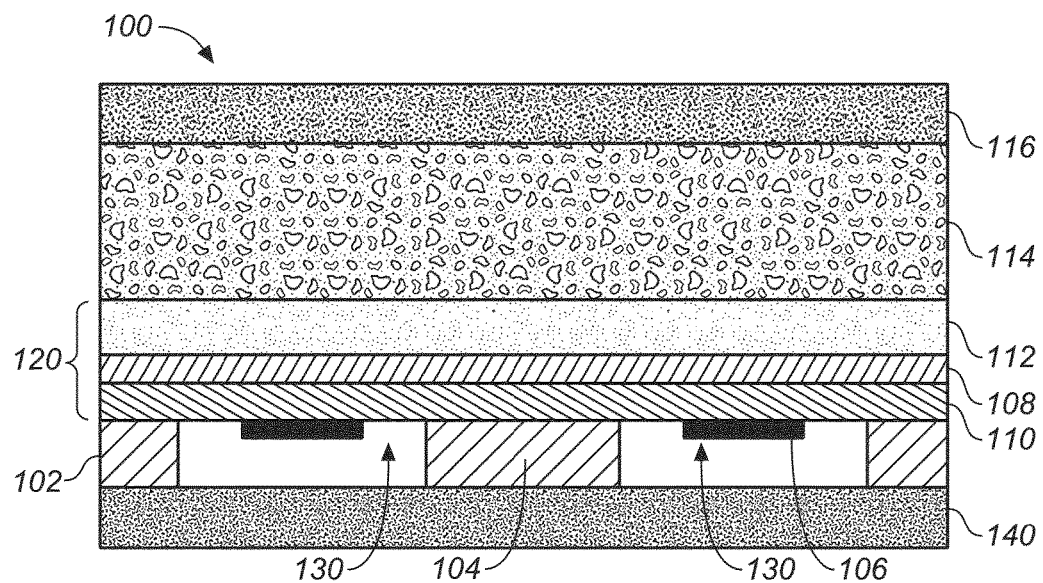
FIG. 1 is a diagram illustrating a PMUT device having a center pinned membrane, according to some embodiments.

The following Description of Embodiments is merely provided by way of example and not of limitation. Furthermore, there is no intention to be bound by any expressed or implied theory presented in the preceding background or in the following Description of Embodiments.

Reference will now be made in detail to various embodiments of the subject matter, examples of which are illustrated in the accompanying drawings. While various embodiments are discussed herein, it will be understood that they are not intended to limit to these embodiments. On the contrary, the presented embodiments are intended to cover alternatives, modifications and equivalents, which may be included within the spirit and scope the various embodiments as defined by the appended claims. Furthermore, in this Description of Embodiments, numerous specific details are set forth in order to provide a thorough understanding of embodiments of the present subject matter. However, embodiments may be practiced without these specific details. In other instances, well known methods, procedures, components, and circuits have not been described in detail as not to unnecessarily obscure aspects of the described embodiments.

Notation and Nomenclature

Some portions of the detailed descriptions which follow are presented in terms of procedures, logic blocks, processing and other symbolic representations of operations on data within an electrical device. These descriptions and representations are the means used by those skilled in the data processing arts to most effectively convey the substance of their work to others skilled in the art. In the present application, a procedure, logic block, process, or the like, is conceived to be one or more self-consistent procedures or instructions leading to a desired result. The procedures are those requiring physical manipulations of physical quantities. Usually, although not necessarily, these quantities take the form of acoustic (e.g., ultrasonic) signals capable of being transmitted and received by an electronic device and/or electrical or magnetic signals capable of being stored, transferred, combined, compared, and otherwise manipulated in an electrical device.

It should be borne in mind, however, that all of these and similar terms are to be associated with the appropriate physical quantities and are merely convenient labels applied to these quantities. Unless specifically stated otherwise as apparent from the following discussions, it is appreciated that throughout the description of embodiments, discussions utilizing terms such as "adjusting" "determining," "controlling," "activating," "detecting," "interacting," "capturing," "sensing," "generating," "imaging," "performing," "comparing," "updating," "transmitting," "entering," or the like, refer to the actions and processes of an electronic device such as an electrical device.

Embodiments described herein may be discussed in the general context of processor-executable instructions residing on some form of non-transitory processor-readable medium, such as program modules, executed by one or more computers or other devices. Generally, program modules include routines, programs, objects, components, data structures, etc., that perform particular tasks or implement particular abstract data types. The functionality of the program modules may be combined or distributed as desired in various embodiments.

In the figures, a single block may be described as performing a function or functions; however, in actual practice, the function or functions performed by that block may be performed in a single component or across multiple components, and/or may be performed using hardware, using software, or using a combination of hardware and software. To clearly illustrate this interchangeability of hardware and software, various illustrative components, blocks, modules, logic, circuits, and steps have been described generally in terms of their functionality. Whether such functionality is implemented as hardware or software depends upon the particular application and design constraints imposed on the overall system. Skilled artisans may implement the described functionality in varying ways for each particular application, but such implementation decisions should not be interpreted as causing a departure from the scope of the present disclosure. Also, the example fingerprint sensing system and/or mobile electronic device described herein may include components other than those shown, including well-known components.

Various techniques described herein may be implemented in hardware, software, firmware, or any combination thereof, unless specifically described as being implemented in a specific manner. Any features described as modules or components may also be implemented together in an integrated logic device or separately as discrete but interoperable logic devices. If implemented in software, the techniques may be realized at least in part by a non-transitory processor-readable storage medium comprising instructions that, when executed, perform one or more of the methods described herein. The non-transitory processor-readable data storage medium may form part of a computer program product, which may include packaging materials.

The non-transitory processor-readable storage medium may comprise random access memory (RAM) such as synchronous dynamic random access memory (SDRAM), read only memory (ROM), non-volatile random access memory (NVRAM), electrically erasable programmable read-only memory (EEPROM), FLASH memory, other known storage media, and the like. The techniques additionally, or alternatively, may be realized at least in part by a processor-readable communication medium that carries or communicates code in the form of instructions or data structures and that can be accessed, read, and/or executed by a computer or other processor.

Various embodiments described herein may be executed by one or more processors, such as one or more motion processing units (MPUs), sensor processing units (SPUs), host processor(s) or core(s) thereof, digital signal processors (DSPs), general purpose microprocessors, application specific integrated circuits (ASICs), application specific instruction set processors (ASIPs), field programmable gate arrays (FPGAs), a programmable logic controller (PLC), a complex programmable logic device (CPLD), a discrete gate or transistor logic, discrete hardware components, or any combination thereof designed to perform the functions described herein, or other equivalent integrated or discrete logic circuitry. The term "processor," as used herein may refer to any of the foregoing structures or any other structure suitable for implementation of the techniques described herein. As it employed in the subject specification, the term "processor" can refer to substantially any computing processing unit or device comprising, but not limited to comprising, single-core processors; single-processors with software multithread execution capability; multi-core processors; multi-core processors with software multithread execution capability; multi-core processors with hardware multithread technology; parallel platforms; and parallel platforms with distributed shared memory. Moreover, processors can exploit nano-scale architectures such as, but not limited to, molecular and quantum-dot based transistors, switches and gates, in order to optimize space usage or enhance performance of user equipment. A processor may also be implemented as a combination of computing processing units.

In addition, in some aspects, the functionality described herein may be provided within dedicated software modules or hardware modules configured as described herein. Also, the techniques could be fully implemented in one or more circuits or logic elements. A general purpose processor may be a microprocessor, but in the alternative, the processor may be any conventional processor, controller, microcontroller, or state machine. A processor may also be implemented as a combination of computing devices, e.g., a combination of an SPU/MPU and a microprocessor, a plurality of microprocessors, one or more microprocessors in conjunction with an SPU core, MPU core, or any other such configuration.

Overview of Discussion

Discussion begins with a description of an example piezoelectric micromachined ultrasonic transducer (PMUT), in accordance with various embodiments. Example arrays including ultrasonic transducers are then described.

In accordance with various embodiments, an electronic device includes an array of ultrasonic transducers for generating and receiving ultrasonic signals, and an acoustic coupling layer overlying the array of ultrasonic transducers, wherein the ultrasonic signals are propagated through the acoustic coupling layer. In one embodiment, the ultrasonic transducers include PMUT devices. In one embodiment, the ultrasonic transducers include Capacitive Micromachined Ultrasonic Transducer (CMUT) devices. In one embodiment, the electronic device further includes sidewalls bounding the array of ultrasonic transducers and the acoustic coupling layer.

In one embodiment, the electronic device further includes a cover overlying the acoustic coupling layer. In one embodiment, the cover is curved such that the acoustic coupling layer is thicker at a midpoint of the array of ultrasonic transducers than towards an edge of the array of ultrasonic transducers. In one embodiment, the cover has varying thickness such that the cover is thinner at a midpoint of the cover and thicker towards an edge of the cover.

In one embodiment, the electronic device further includes a plurality of refractive acoustic elements. In one embodiment, refractive acoustic elements are disposed within the acoustic coupling layer such that a refractive acoustic element of the plurality of refractive acoustic elements is associated with an ultrasonic transducer of the array of ultrasonic transducers. In one embodiment, refractive acoustic elements are disposed adjacent to the array of ultrasonic transducers. In one embodiment, refractive acoustic elements are disposed within the cover such that a refractive acoustic element of the plurality of refractive acoustic elements is associated with an ultrasonic transducer of the array of ultrasonic transducers. It should be appreciated that refractive acoustic elements may be located in various locations. For instance, refractive acoustic elements may be located in the cover, suspended in the acoustic coupling material, and/or adjacent to the array of ultrasonic transducers in any combination.

In accordance with various embodiments, an array of ultrasonic transducers for generating and receiving ultrasonic signals includes sidewalls bounding the array of ultrasonic transducers, an acoustic coupling layer overlying the array of ultrasonic transducers and bounded by the sidewalls, wherein the ultrasonic signals are propagated through the acoustic coupling layer, the acoustic coupling layer comprises an acoustic material supporting transmission of the ultrasonic signals, and a cover overlying the sidewalls and the acoustic coupling layer.

In one embodiment, the sidewalls include a relief channel for allowing expulsion of excess acoustic material of the acoustic coupling layer from a cavity defined by the array of ultrasonic transducers, the sidewalls and the cover. In one embodiment, the relief channel is a groove situated at a top edge of the sidewalls. In one embodiment, the relief channel is an opening situated within the sidewalls. In one embodiment, the cover includes a relief channel for allowing expulsion of excess acoustic material of the acoustic coupling layer from a cavity defined by the array of ultrasonic transducers, the sidewalls and the cover.

In accordance with various embodiments, a mobile device includes a processor, a memory unit, a display device disposed on a first surface of the mobile device, and a fingerprint sensor disposed on a second surface of the mobile device. The fingerprint sensor includes an array of ultrasonic transducers for generating and receiving ultrasonic signals, and an acoustic coupling layer overlying the array of ultrasonic transducers, wherein the ultrasonic signals are propagated through the acoustic coupling layer. In one embodiment, the ultrasonic transducers include PMUT devices. In one embodiment, the ultrasonic transducers include CMUT devices. In one embodiment, the fingerprint sensor includes a button overlying the acoustic coupling layer such that the button is disposed on the second surface.

In one embodiment, the second surface is perpendicular to the first surface. In one embodiment, the second surface is a curved surface having a curvature, such that the fingerprint sensor is curved to match the curvature of the curved surface. In one embodiment, the acoustic coupling layer of the fingerprint sensor is curved to match the curvature of the curved surface. In another embodiment, the first surface is a top surface of the mobile device and the second surface is a bottom surface of the mobile device.

In one embodiment, the fingerprint sensor further includes a cover overlying the acoustic coupling layer, wherein the cover is curved to match the curvature of the curved surface. In one embodiment, the cover has varying thickness such that the cover is thinner at a midpoint of the cover and thicker towards an edge of the cover.

Piezoelectric Micromachined Ultrasonic Transducer (PMUT)

Systems and methods disclosed herein, in one or more aspects provide efficient structures for an acoustic transducer (e.g., a piezoelectric micromachined actuated transducer or PMUT). One or more embodiments are now described with reference to the drawings, wherein like reference numerals are used to refer to like elements throughout. In the following description, for purposes of explanation, numerous specific details are set forth in order to provide a thorough understanding of the various embodiments. It may be evident, however, that the various embodiments can be practiced without these specific details. In other instances, well-known structures and devices are shown in block diagram form in order to facilitate describing the embodiments in additional detail.

As used in this application, the term "or" is intended to mean an inclusive "or" rather than an exclusive "or". That is, unless specified otherwise, or clear from context, "X employs A or B" is intended to mean any of the natural inclusive permutations. That is, if X employs A; X employs B; or X employs both A and B, then "X employs A or B" is satisfied under any of the foregoing instances. In addition, the articles "a" and "an" as used in this application and the appended claims should generally be construed to mean "one or more" unless specified otherwise or clear from context to be directed to a singular form. In addition, the word "coupled" is used herein to mean direct or indirect electrical or mechanical coupling. In addition, the word "example" is used herein to mean serving as an example, instance, or illustration.

FIG. 1 is a diagram illustrating a PMUT device 100 having a center pinned membrane, according to some embodiments. PMUT device 100 includes an interior pinned membrane 120 positioned over a substrate 140 to define a cavity 130. In one embodiment, membrane 120 is attached both to a surrounding edge support 102 and interior support 104. In one embodiment, edge support 102 is connected to an electric potential. Edge support 102 and interior support 104 may be made of electrically conducting materials, such as and without limitation, aluminum, molybdenum, or titanium. Edge support 102 and interior support 104 may also be made of dielectric materials, such as silicon dioxide, silicon nitride or aluminum oxide that have electrical connections on the sides or in vias through edge support 102 or interior support 104, electrically coupling lower electrode 106 to electrical wiring in substrate 140.

In one embodiment, both edge support 102 and interior support 104 are attached to a substrate 140. In various embodiments, substrate 140 may include at least one of, and without limitation, silicon or silicon nitride. It should be appreciated that substrate 140 may include electrical wirings and connection, such as aluminum or copper. In one embodiment, substrate 140 includes a CMOS logic wafer bonded to edge support 102 and interior support 104. In one embodiment, the membrane 120 comprises multiple layers. In an example embodiment, the membrane 120 includes lower electrode 106, piezoelectric layer 110, and upper electrode 108, where lower electrode 106 and upper electrode 108 are coupled to opposing sides of piezoelectric layer 110. As shown, lower electrode 106 is coupled to a lower surface of piezoelectric layer 110 and upper electrode 108 is coupled to an upper surface of piezoelectric layer 110. It should be appreciated that, in various embodiments, PMUT device 100 is a microelectromechanical (MEMS) device.

In one embodiment, membrane 120 also includes a mechanical support layer 112 (e.g., stiffening layer) to mechanically stiffen the layers. In various embodiments, mechanical support layer 112 may include at least one of, and without limitation, silicon, silicon oxide, silicon nitride, aluminum, molybdenum, titanium, etc. In one embodiment, PMUT device 100 also includes an acoustic coupling layer 114 above membrane 120 for supporting transmission of acoustic signals. It should be appreciated that acoustic coupling layer can include air, liquid, gel-like materials, epoxy, or other materials for supporting transmission of acoustic signals. In one embodiment, PMUT device 100 also includes platen layer 116 above acoustic coupling layer 114 for containing acoustic coupling layer 114 and providing a contact surface for a finger or other sensed object with PMUT device 100. It should be appreciated that, in various embodiments, acoustic coupling layer 114 provides a contact surface, such that platen layer 116 is optional. Moreover, it should be appreciated that acoustic coupling layer 114 and/or platen layer 116 may be included with or used in conjunction with multiple PMUT devices. For example, an array of PMUT devices may be coupled with a single acoustic coupling layer 114 and/or platen layer 116.

Figure 2:
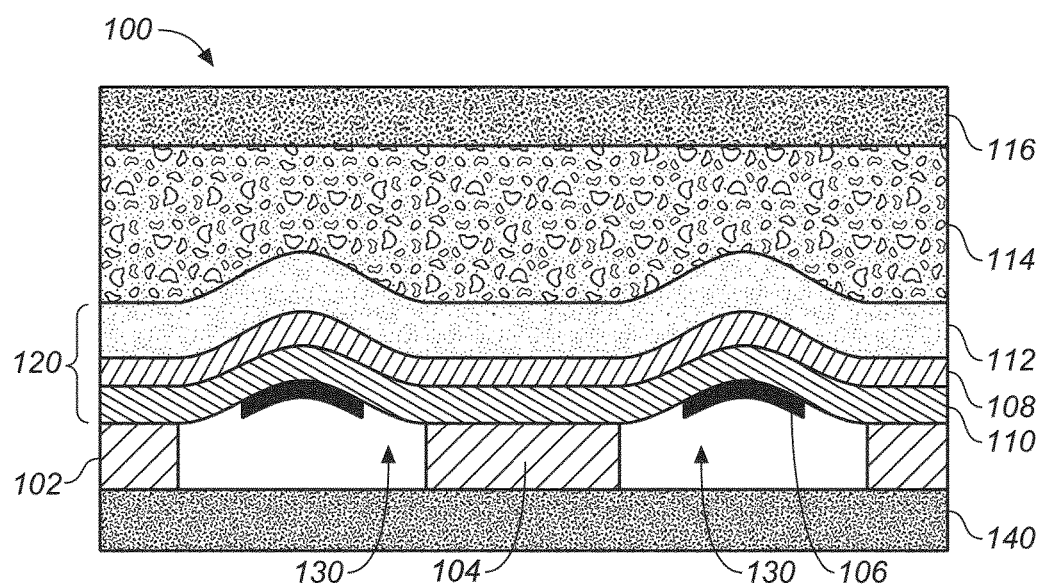
FIG. 2 is a diagram illustrating an example of membrane movement during activation of a PMUT device, according to some embodiments.

FIG. 2 is a diagram illustrating an example of membrane movement during activation of PMUT device 100, according to some embodiments. As illustrated with respect to FIG. 2, in operation, responsive to an object proximate platen layer 116, the electrodes 106 and 108 deliver a high frequency electric charge to the piezoelectric layer 110, causing those portions of the membrane 120 not pinned to the surrounding edge support 102 or interior support 104 to be displaced upward into the acoustic coupling layer 114. This generates a pressure wave that can be used for signal probing of the object. Return echoes can be detected as pressure waves causing movement of the membrane, with compression of the piezoelectric material in the membrane causing an electrical signal proportional to amplitude of the pressure wave.

The described PMUT device 100 can be used with almost any electrical device that converts a pressure wave into mechanical vibrations and/or electrical signals. In one aspect, the PMUT device 100 can comprise an acoustic sensing element (e.g., a piezoelectric element) that generates and senses ultrasonic sound waves. An object in a path of the generated sound waves can create a disturbance (e.g., changes in frequency or phase, reflection signal, echoes, etc.) that can then be sensed. The interference can be analyzed to determine physical parameters such as (but not limited to) distance, density and/or speed of the object. As an example, the PMUT device 100 can be utilized in various applications, such as, but not limited to, fingerprint or physiologic sensors suitable for wireless devices, industrial systems, automotive systems, robotics, telecommunications, security, medical devices, etc. For example, the PMUT device 100 can be part of a sensor array comprising a plurality of ultrasonic transducers deposited on a wafer, along with various logic, control and communication electronics. A sensor array may comprise homogenous or identical PMUT devices 100, or a number of different or heterogonous device structures.

In various embodiments, the PMUT device 100 employs a piezoelectric layer 110, comprised of materials such as, but not limited to, Aluminum nitride (AlN), lead zirconate titanate (PZT), quartz, polyvinylidene fluoride (PVDF), and/or zinc oxide, to facilitate both acoustic signal production and sensing. The piezoelectric layer 110 can generate electric charges under mechanical stress and conversely experience a mechanical strain in the presence of an electric field. For example, the piezoelectric layer 110 can sense mechanical vibrations caused by an ultrasonic signal and produce an electrical charge at the frequency (e.g., ultrasonic frequency) of the vibrations. Additionally, the piezoelectric layer 110 can generate an ultrasonic wave by vibrating in an oscillatory fashion that might be at the same frequency (e.g., ultrasonic frequency) as an input current generated by an alternating current (AC) voltage applied across the piezoelectric layer 110. It should be appreciated that the piezoelectric layer 110 can include almost any material (or combination of materials) that exhibits piezoelectric properties, such that the structure of the material does not have a center of symmetry and a tensile or compressive stress applied to the material alters the separation between positive and negative charge sites in a cell causing a polarization at the surface of the material. The polarization is directly proportional to the applied stress and is direction dependent so that compressive and tensile stresses results in electric fields of opposite polarizations.

Figure 10:
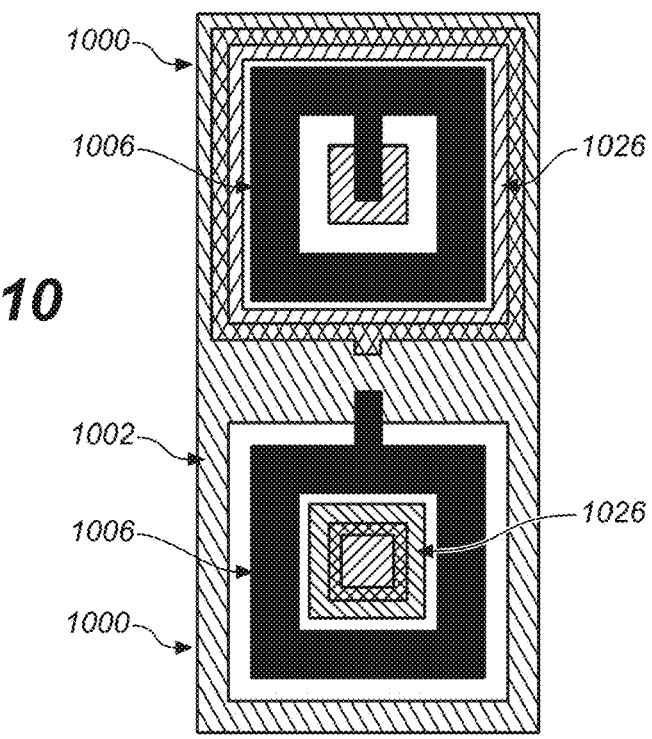
FIG. 10 illustrates an example pair of PMUT devices in a PMUT array, with each PMUT having differing electrode patterning, according to some embodiments.

Further, the PMUT device 100 comprises electrodes 106 and 108 that supply and/or collect the electrical charge to/from the piezoelectric layer 110. It should be appreciated that electrodes 106 and 108 can be continuous and/or patterned electrodes (e.g., in a continuous layer and/or a patterned layer). For example, as illustrated, electrode 106 is a patterned electrode and electrode 108 is a continuous electrode. As an example, electrodes 106 and 108 can be comprised of almost any metal layers, such as, but not limited to, Aluminum (Al)/Titanium (Ti), Molybdenum (Mo), etc., which are coupled with and on opposing sides of the piezoelectric layer 110. In one embodiment, PMUT device also includes a third electrode, as illustrated in FIG. 10 and described below.

According to an embodiment, the acoustic impedance of acoustic coupling layer 114 is selected to be similar to the acoustic impedance of the platen layer 116, such that the acoustic wave is efficiently propagated to/from the membrane 120 through acoustic coupling layer 114 and platen layer 116. As an example, the platen layer 116 can comprise various materials having an acoustic impedance in the range between 0.8 to 4 MRayl, such as, but not limited to, plastic, resin, rubber, Teflon, epoxy, etc. In another example, the platen layer 116 can comprise various materials having a high acoustic impedance (e.g., an acoustic impendence greater than 10 MRayl), such as, but not limited to, glass, aluminum-based alloys, sapphire, etc. Typically, the platen layer 116 can be selected based on an application of the sensor. For instance, in fingerprinting applications, platen layer 116 can have an acoustic impedance that matches (e.g., exactly or approximately) the acoustic impedance of human skin (e.g., $1.6 \times 10^6$ Rayl). Further, in one aspect, the platen layer 116 can further include a thin layer of anti-scratch material. In various embodiments, the anti-scratch layer of the platen layer 116 is less than the wavelength of the acoustic wave that is to be generated and/or sensed to provide minimum interference during propagation of the acoustic wave. As an example, the anti-scratch layer can comprise various hard and scratch-resistant materials (e.g., having a Mohs hardness of over 7 on the Mohs scale), such as, but not limited to sapphire, glass, MN, Titanium nitride (TiN), Silicon carbide (SiC), diamond, etc. As an example, PMUT device 100 can operate at 20 MHz and accordingly, the wavelength of the acoustic wave propagating through the acoustic coupling layer 114 and platen layer 116 can be 70-150 microns. In this example scenario, insertion loss can be reduced and acoustic wave propagation efficiency can be improved by utilizing an anti-scratch layer having a thickness of 1 micron and the platen layer 116 as a whole having a thickness of 1-2 millimeters. It is noted that the term "anti-scratch material" as used herein relates to a material that is resistant to scratches and/or scratch-proof and provides substantial protection against scratch marks.

In accordance with various embodiments, the PMUT device 100 can include metal layers (e.g., Aluminum (Al)/ Titanium (Ti), Molybdenum (Mo), etc.) patterned to form electrode 106 in particular shapes (e.g., ring, circle, square, octagon, hexagon, etc.) that are defined in-plane with the membrane 120. Electrodes can be placed at a maximum strain area of the membrane 120 or placed at close to either or both the surrounding edge support 102 and interior support 104. Furthermore, in one example, electrode 108 can be formed as a continuous layer providing a ground plane in contact with mechanical support layer 112, which can be formed from silicon or other suitable mechanical stiffening material. In still other embodiments, the electrode 106 can be routed along the interior support 104, advantageously reducing parasitic capacitance as compared to routing along the edge support 102.

For example, when actuation voltage is applied to the electrodes, the membrane 120 will deform and move out of plane. The motion then pushes the acoustic coupling layer 114 it is in contact with and an acoustic (ultrasonic) wave is generated. Oftentimes, vacuum is present inside the cavity 130 and therefore damping contributed from the media within the cavity 130 can be ignored. However, the acoustic coupling layer 114 on the other side of the membrane 120 can substantially change the damping of the PMUT device 100. For example, a quality factor greater than 20 can be observed when the PMUT device 100 is operating in air with atmosphere pressure (e.g., acoustic coupling layer 114 is air) and can decrease lower than 2 if the PMUT device 100 is operating in water (e.g., acoustic coupling layer 114 is water).

Figure 3:
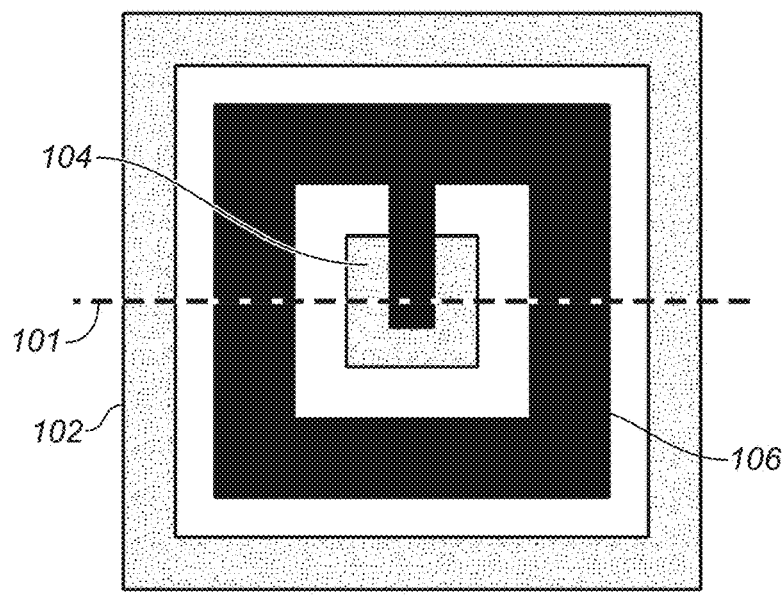
FIG. 3 is a top view of the PMUT device of FIG. 1, according to some embodiments.

FIG. 3 is a top view of the PMUT device 100 of FIG. 1 having a substantially square shape, which corresponds in part to a cross section along dotted line 101 in FIG. 3. Layout of surrounding edge support 102, interior support 104, and lower electrode 106 are illustrated, with other continuous layers not shown. It should be appreciated that the term "substantially" in "substantially square shape" is intended to convey that a PMUT device 100 is generally square-shaped, with allowances for variations due to manufacturing processes and tolerances, and that slight deviation from a square shape (e.g., rounded corners, slightly wavering lines, deviations from perfectly orthogonal corners or intersections, etc.) may be present in a manufactured device. While a generally square arrangement PMUT device is shown, alternative embodiments including rectangular, hexagon, octagonal, circular, or elliptical are contemplated. In other embodiments, more complex electrode or PMUT device shapes can be used, including irregular and non-symmetric layouts such as chevrons or pentagons for edge support and electrodes.

Figure 4:
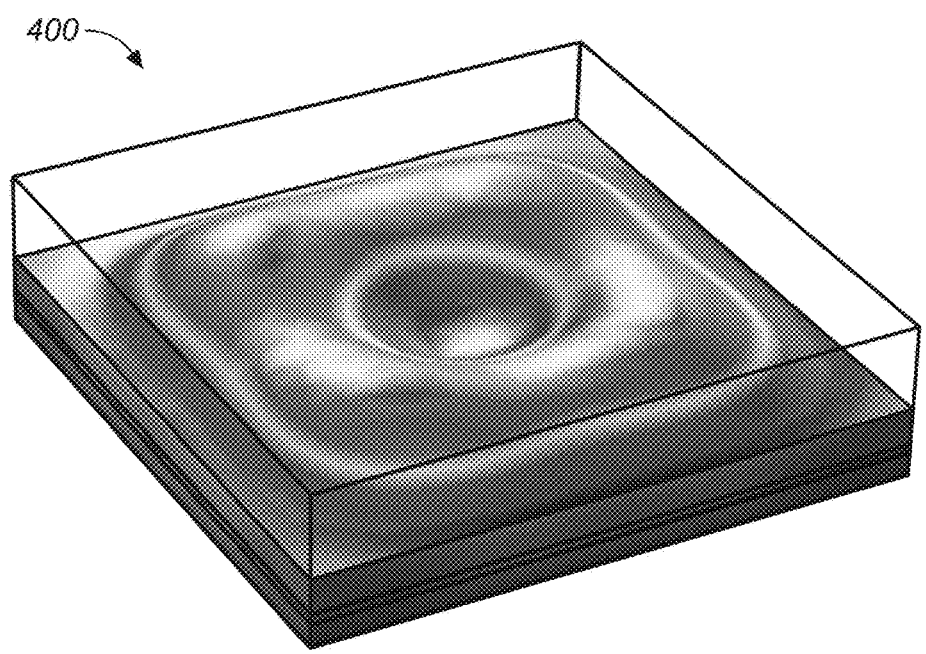
FIG. 4 is a simulated map illustrating maximum vertical displacement of the membrane of the PMUT device shown in FIGS. 1-3, according to some embodiments.

FIG. 4 is a simulated topographic map 400 illustrating maximum vertical displacement of the membrane 120 of the PMUT device 100 shown in FIGS. 1-3. As indicated, maximum displacement generally occurs along a center axis of the lower electrode, with corner regions having the greatest displacement. As with the other figures, FIG. 4 is not drawn to scale with the vertical displacement exaggerated for illustrative purposes, and the maximum vertical displacement is a fraction of the horizontal surface area comprising the PMUT device 100. In an example PMUT device 100, maximum vertical displacement may be measured in nanometers, while surface area of an individual PMUT device 100 may be measured in square microns.

Figure 5:
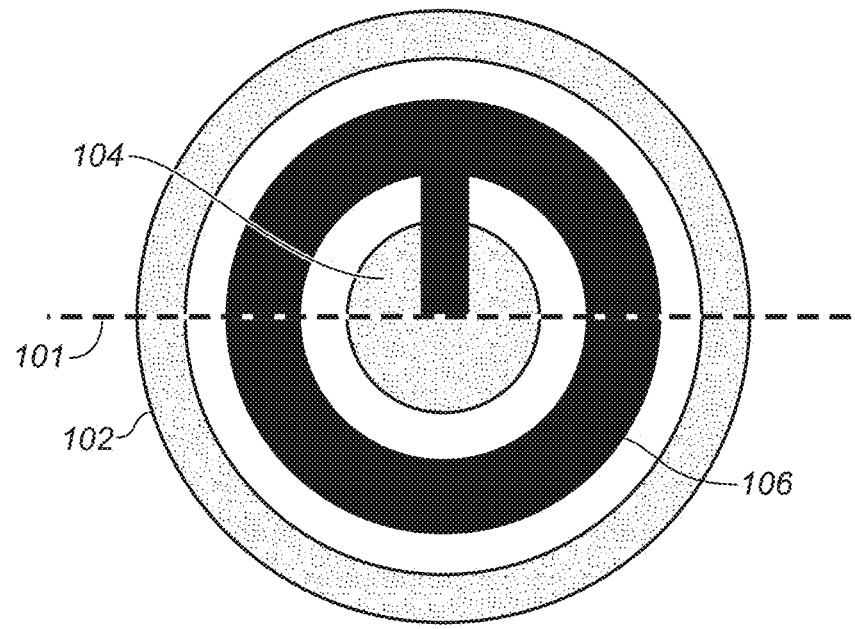
FIG. 5 is a top view of an example PMUT device having a circular shape, according to some embodiments.

FIG. 5 is a top view of another example of the PMUT device 100 of FIG. 1 having a substantially circular shape, which corresponds in part to a cross section along dotted line 101 in FIG. 5. Layout of surrounding edge support 102, interior support 104, and lower electrode 106 are illustrated, with other continuous layers not shown. It should be appreciated that the term "substantially" in "substantially circular shape" is intended to convey that a PMUT device 100 is generally circle-shaped, with allowances for variations due to manufacturing processes and tolerances, and that slight deviation from a circle shape (e.g., slight deviations on radial distance from center, etc.) may be present in a manufactured device.

Figure 6:
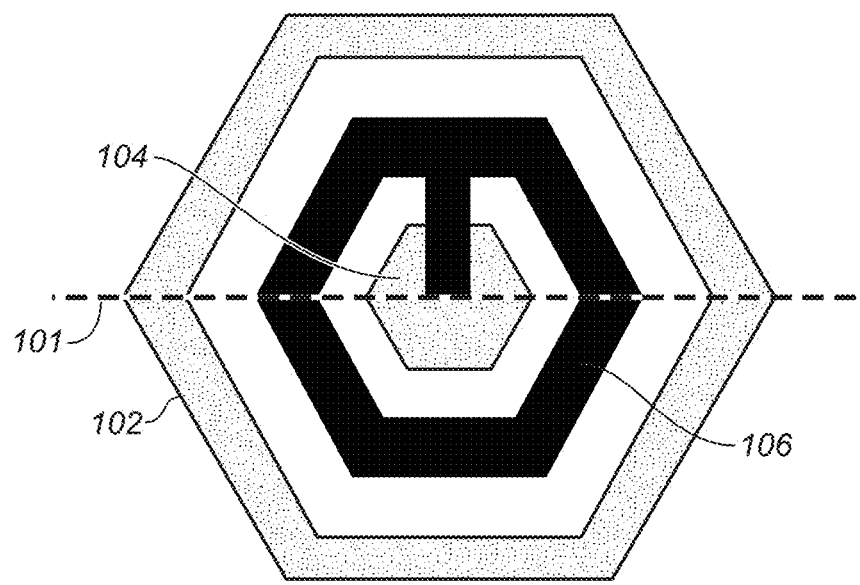
FIG. 6 is a top view of an example PMUT device having a hexagonal shape, according to some embodiments.

FIG. 6 is a top view of another example of the PMUT device 100 of FIG. 1 having a substantially hexagonal shape, which corresponds in part to a cross section along dotted line 101 in FIG. 6. Layout of surrounding edge support 102, interior support 104, and lower electrode 106 are illustrated, with other continuous layers not shown. It should be appreciated that the term "substantially" in "substantially hexagonal shape" is intended to convey that a PMUT device 100 is generally hexagon-shaped, with allowances for variations due to manufacturing processes and tolerances, and that slight deviation from a hexagon shape (e.g., rounded corners, slightly wavering lines, deviations from perfectly orthogonal corners or intersections, etc.) may be present in a manufactured device.

Figure 7:
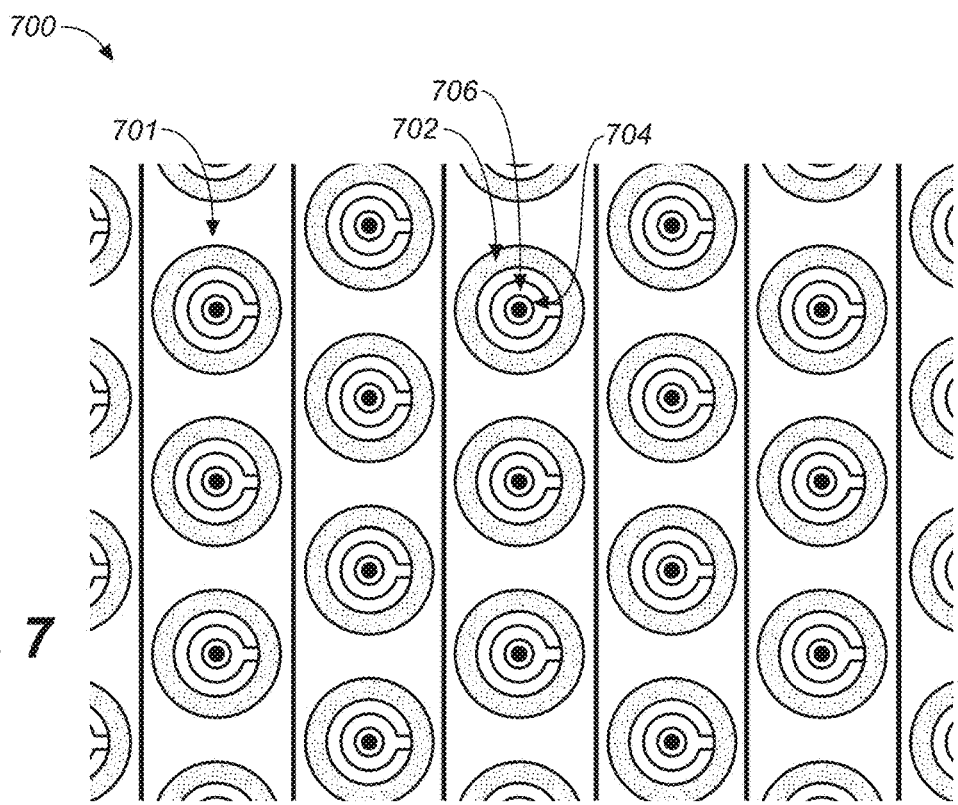
FIG. 7 illustrates an example array of circular-shaped PMUT devices, according to some embodiments.

FIG. 7 illustrates an example two-dimensional array 700 of circular-shaped PMUT devices 701 formed from PMUT devices having a substantially circular shape similar to that discussed in conjunction with FIGS. 1, 2 and 5. Layout of circular surrounding edge support 702, interior support 704, and annular or ring shaped lower electrode 706 surrounding the interior support 704 are illustrated, while other continuous layers are not shown for clarity. As illustrated, array 700 includes columns of circular-shaped PMUT devices 701 that are offset. It should be appreciated that the circular-shaped PMUT devices 701 may be closer together, such that edges of the columns of circular-shaped PMUT devices 701 overlap. Moreover, it should be appreciated that circular-shaped PMUT devices 701 may contact each other. In various embodiments, adjacent circular-shaped PMUT devices 701 are electrically isolated. In other embodiments, groups of adjacent circular-shaped PMUT devices 701 are electrically connected, where the groups of adjacent circular-shaped PMUT devices 701 are electrically isolated.

Figure 8:
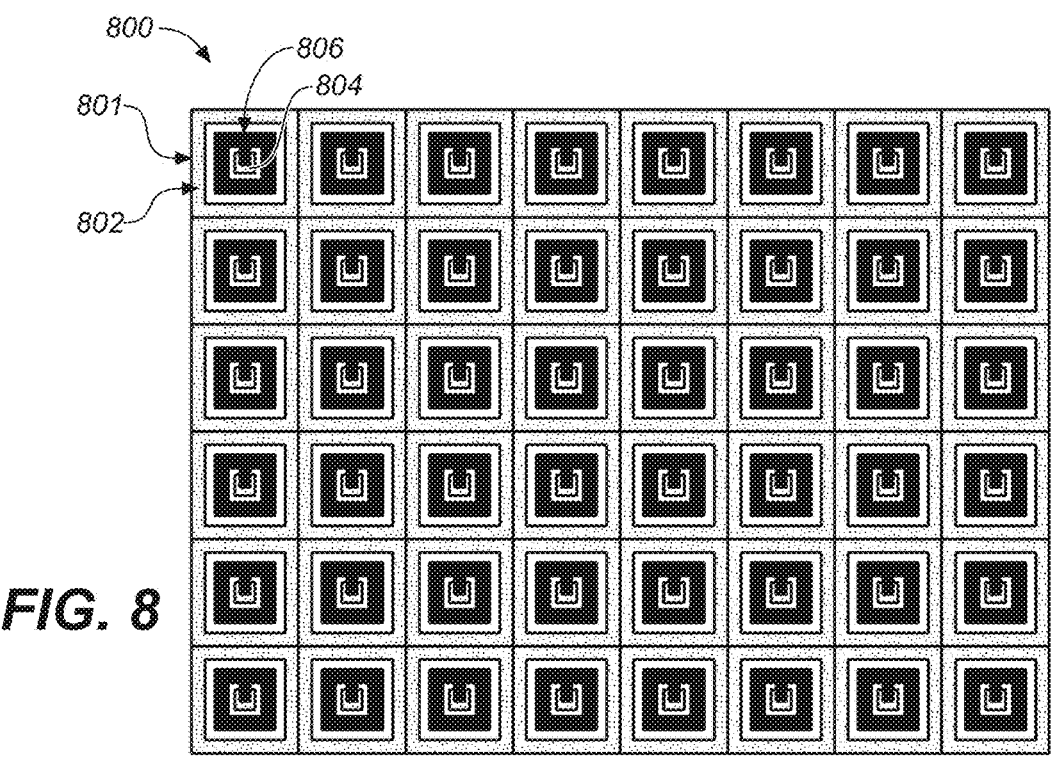
FIG. 8 illustrates an example array of square-shaped PMUT devices, according to some embodiments.

FIG. 8 illustrates an example two-dimensional array 800 of square-shaped PMUT devices 801 formed from PMUT devices having a substantially square shape similar to that discussed in conjunction with FIGS. 1, 2 and 3. Layout of square surrounding edge support 802, interior support 804, and square-shaped lower electrode 806 surrounding the interior support 804 are illustrated, while other continuous layers are not shown for clarity. As illustrated, array 800 includes columns of square-shaped PMUT devices 801 that are in rows and columns. It should be appreciated that rows or columns of the square-shaped PMUT devices 801 may be offset. Moreover, it should be appreciated that square-shaped PMUT devices 801 may contact each other or be spaced apart. In various embodiments, adjacent square-shaped PMUT devices 801 are electrically isolated. In other embodiments, groups of adjacent square-shaped PMUT devices 801 are electrically connected, where the groups of adjacent square-shaped PMUT devices 801 are electrically isolated.

Figure 9:
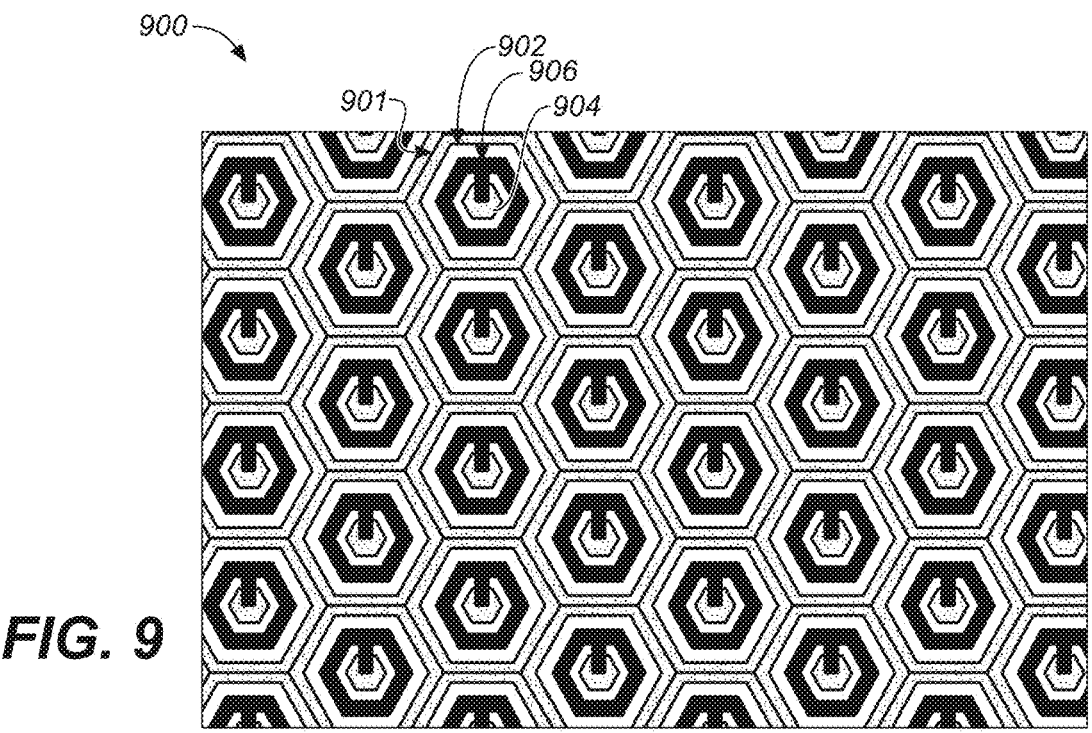
FIG. 9 illustrates an example array of hexagonal-shaped PMUT devices, according to some embodiments.

FIG. 9 illustrates an example two-dimensional array 900 of hexagon-shaped PMUT devices 901 formed from PMUT devices having a substantially hexagon shape similar to that discussed in conjunction with FIGS. 1, 2 and 6. Layout of hexagon-shaped surrounding edge support 902, interior support 904, and hexagon-shaped lower electrode 906 surrounding the interior support 904 are illustrated, while other continuous layers are not shown for clarity. It should be appreciated that rows or columns of the hexagon-shaped PMUT devices 901 may be offset. Moreover, it should be appreciated that hexagon-shaped PMUT devices 901 may contact each other or be spaced apart. In various embodiments, adjacent hexagon-shaped PMUT devices 901 are electrically isolated. In other embodiments, groups of adjacent hexagon-shaped PMUT devices 901 are electrically connected, where the groups of adjacent hexagon-shaped PMUT devices 901 are electrically isolated. While FIGS. 7, 8 and 9 illustrate example layouts of PMUT devices having different shapes, it should be appreciated that many different layouts are available. Moreover, in accordance with various embodiments, arrays of PMUT devices are included within a MEMS layer.

In operation, during transmission, selected sets of PMUT devices in the two-dimensional array can transmit an acoustic signal (e.g., a short ultrasonic pulse) and during sensing, the set of active PMUT devices in the two-dimensional array can detect an interference of the acoustic signal with an object (in the path of the acoustic wave). The received interference signal (e.g., generated based on reflections, echoes, etc. of the acoustic signal from the object) can then be analyzed. As an example, an image of the object, a distance of the object from the sensing component, a density of the object, a motion of the object, etc., can all be determined based on comparing a frequency and/or phase of the interference signal with a frequency and/or phase of the acoustic signal. Moreover, results generated can be further analyzed or presented to a user via a display device (not shown).

FIG. 10 illustrates a pair of example PMUT devices 1000 in a PMUT array, with each PMUT sharing at least one common edge support 1002. As illustrated, the PMUT devices have two sets of independent lower electrode labeled as 1006 and 1026. These differing electrode patterns enable antiphase operation of the PMUT devices 1000, and increase flexibility of device operation. In one embodiment, the pair of PMUTs may be identical, but the two electrodes could drive different parts of the same PMUT antiphase (one contracting, and one extending), such that the PMUT displacement becomes larger. While other continuous layers are not shown for clarity, each PMUT also includes an upper electrode (e.g., upper electrode 108 of FIG. 1). Accordingly, in various embodiments, a PMUT device may include at least three electrodes.

FIGS. 11A, 11B, 11C, and 11D illustrate alternative examples of interior support structures, in accordance with various embodiments. Interior supports structures may also be referred to as "pinning structures," as they operate to pin the membrane to the substrate. It should be appreciated that interior support structures may be positioned anywhere within a cavity of a PMUT device, and may have any type of shape (or variety of shapes), and that there may be more than one interior support structure within a PMUT device. While FIGS. 11A, 11B, 11C, and 11D illustrate alternative examples of interior support structures, it should be appreciated that these examples are for illustrative purposes, and are not intended to limit the number, position, or type of interior support structures of PMUT devices.

Figure 11A:
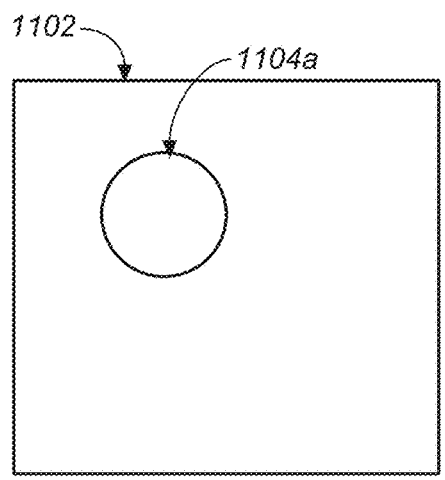
FIGS. 11A, 11B, 11C, and 11D illustrate alternative examples of interior support structures, according to various embodiments.
Figure 11B:
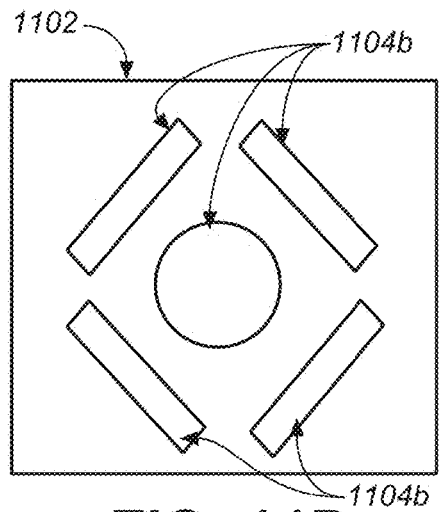
Figure 11C:
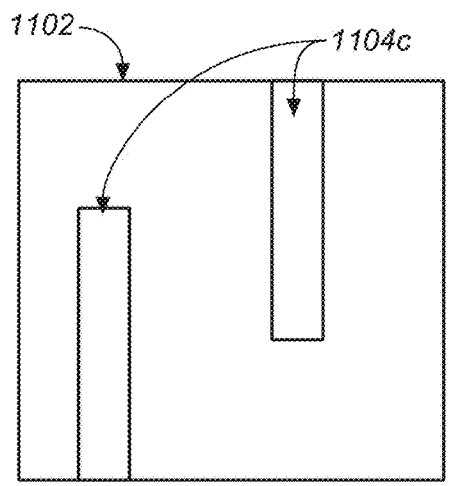
Figure 11D:
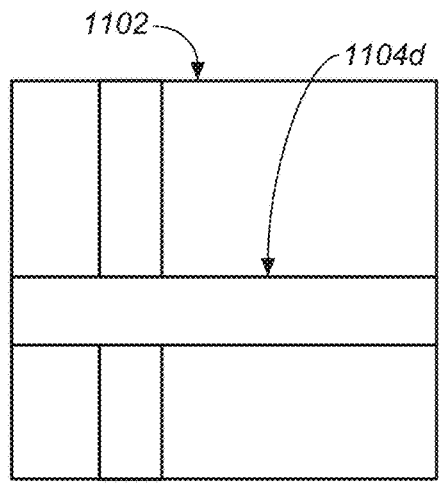

For example, interior supports structures do not have to be centrally located with a PMUT device area, but can be non-centrally positioned within the cavity. As illustrated in FIG. 11A, interior support 1104a is positioned in a non-central, off-axis position with respect to edge support 1102. In other embodiments such as seen in FIG. 11B, multiple interior supports 1104b can be used. In this embodiment, one interior support is centrally located with respect to edge support 1102, while the multiple, differently shaped and sized interior supports surround the centrally located support. In still other embodiments, such as seen with respect to FIGS. 11C and 11D, the interior supports (respectively 1104c and 1104d) can contact a common edge support 1102. In the embodiment illustrated in FIG. 11D, the interior supports 1104d can effectively divide the PMUT device into subpixels. This would allow, for example, activation of smaller areas to generate high frequency ultrasonic waves, and sensing a returning ultrasonic echo with larger areas of the PMUT device. It will be appreciated that the individual pinning structures can be combined into arrays.

Figure 12:
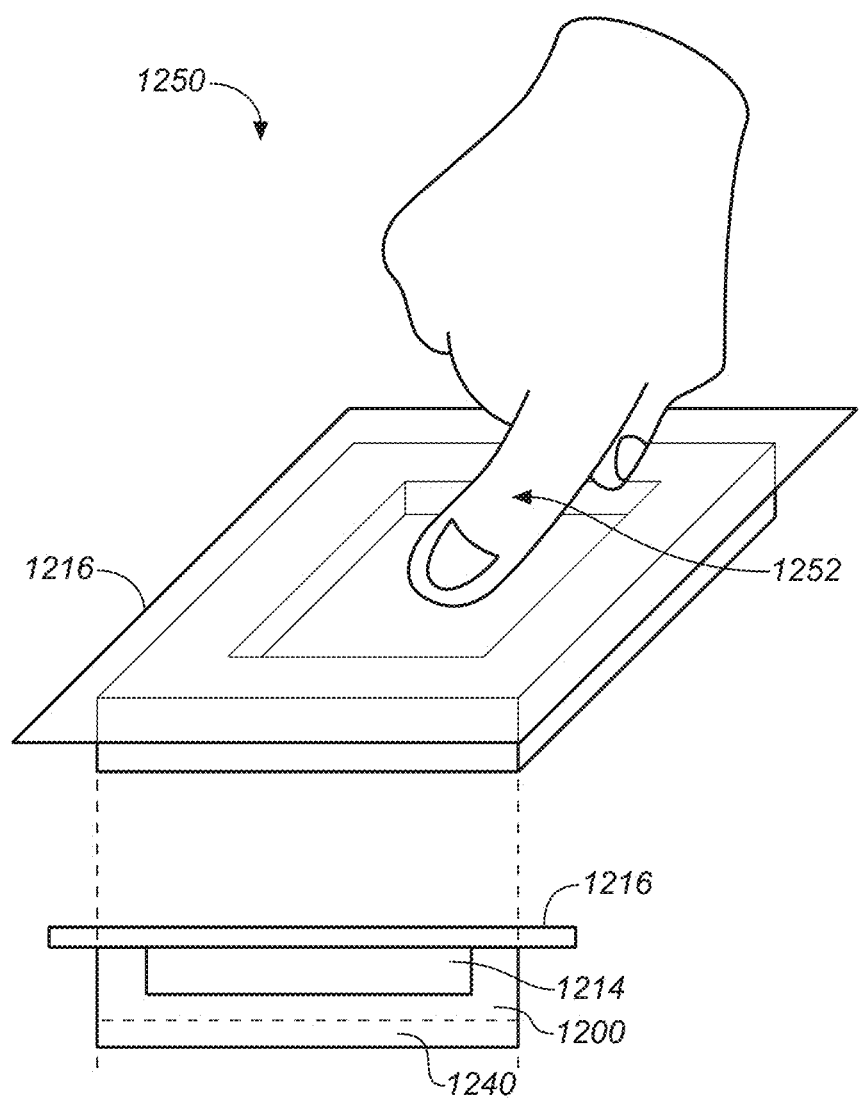
FIG. 12 illustrates a PMUT array used in an ultrasonic fingerprint sensing system, according to some embodiments.

FIG. 12 illustrates an embodiment of a PMUT array used in an ultrasonic fingerprint sensing system 1250. The fingerprint sensing system 1250 can include a platen 1216 onto which a human finger 1252 may make contact. Ultrasonic signals are generated and received by a PMUT device array 1200, and travel back and forth through acoustic coupling layer 1214 and platen 1216. Signal analysis is conducted using processing logic module 1240 (e.g., control logic) directly attached (via wafer bonding or other suitable techniques) to the PMUT device array 1200. It will be appreciated that the size of platen 1216 and the other elements illustrated in FIG. 12 may be much larger (e.g., the size of a handprint) or much smaller (e.g., just a fingertip) than as shown in the illustration, depending on the particular application.

In this example for fingerprinting applications, the human finger 1252 and the processing logic module 1240 can determine, based on a difference in interference of the acoustic signal with valleys and/or ridges of the skin on the finger, an image depicting epi-dermis and/or dermis layers of the finger. Further, the processing logic module 1240 can compare the image with a set of known fingerprint images to facilitate identification and/or authentication. Moreover, in one example, if a match (or substantial match) is found, the identity of user can be verified. In another example, if a match (or substantial match) is found, a command/operation can be performed based on an authorization rights assigned to the identified user. In yet another example, the identified user can be granted access to a physical location and/or network/computer resources (e.g., documents, files, applications, etc.)

In another example, for finger-based applications, the movement of the finger can be used for cursor tracking/movement applications. In such embodiments, a pointer or cursor on a display screen can be moved in response to finger movement. It is noted that processing logic module 1240 can include or be connected to one or more processors configured to confer at least in part the functionality of system 1250. To that end, the one or more processors can execute code instructions stored in memory, for example, volatile memory and/or nonvolatile memory.

Figure 13:
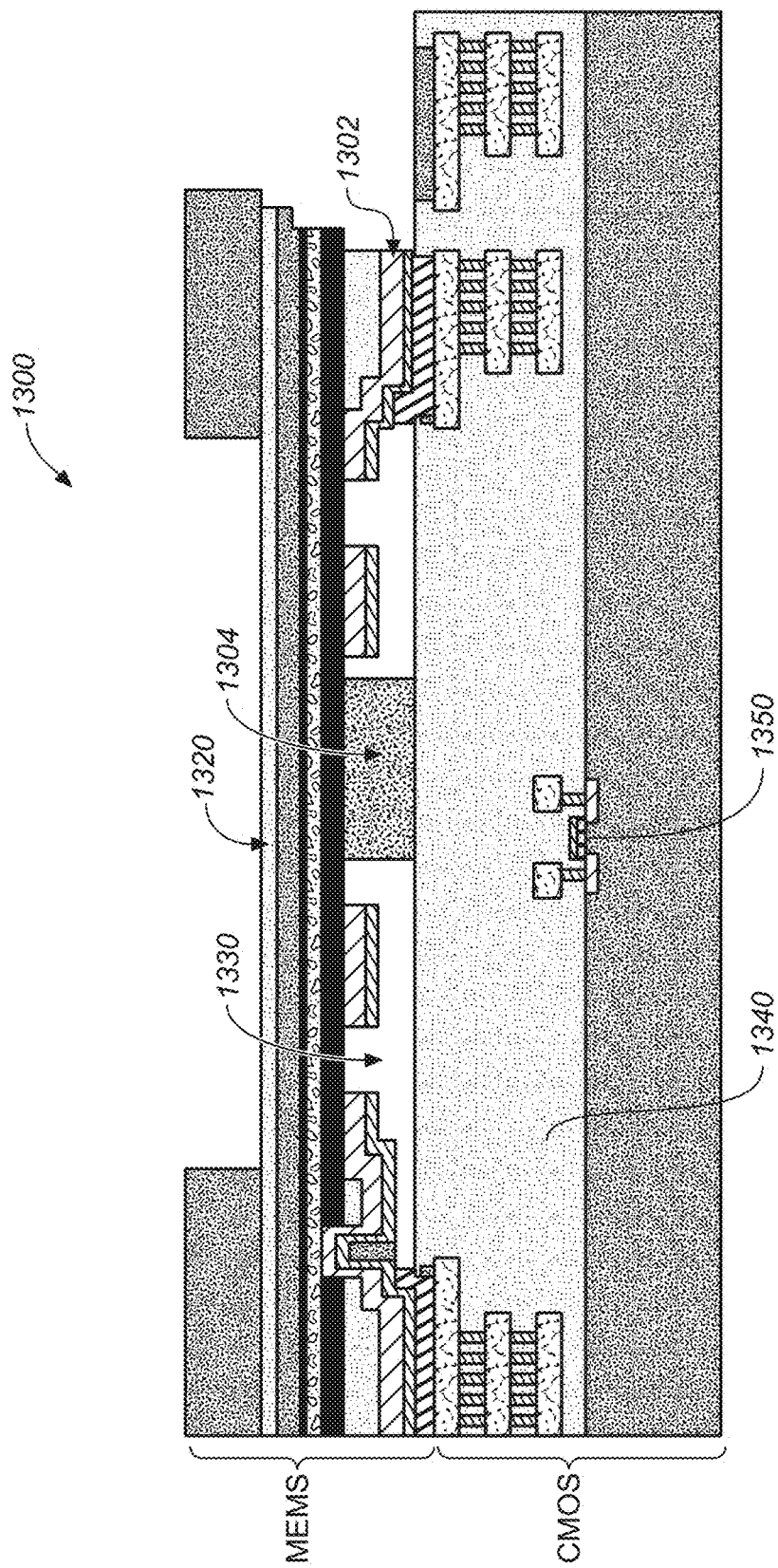
FIG. 13 illustrates an integrated fingerprint sensor formed by wafer bonding a CMOS logic wafer and a microelectromechanical (MEMS) wafer defining PMUT devices, according to some embodiments.

FIG. 13 illustrates an integrated fingerprint sensor 1300 formed by wafer bonding a CMOS logic wafer and a MEMS wafer defining PMUT devices, according to some embodiments. FIG. 13 illustrates in partial cross section one embodiment of an integrated fingerprint sensor formed by wafer bonding a substrate 1340 CMOS logic wafer and a MEMS wafer defining PMUT devices having a common edge support 1302 and separate interior support 1304. For example, the MEMS wafer may be bonded to the CMOS logic wafer using aluminum and germanium eutectic alloys, as described in U.S. Pat. No. 7,442,570. PMUT device 1300 has an interior pinned membrane 1320 formed over a cavity 1330. The membrane 1320 is attached both to a surrounding edge support 1302 and interior support 1304. The membrane 1320 is formed from multiple layers. In one embodiment, integrated fingerprint sensor 1300 includes sensor 1350 in the CMOS logic wafer (e.g., a temperature sensor). In one embodiment, the CMOS logic wafer includes at least one drive circuit for driving transmission of ultrasonic signals from ultrasonic transducers of the array of ultrasonic transducers and at least one receive circuit for receiving reflected ultrasonic signals from ultrasonic transducers of the array of ultrasonic transducers.

Example Arrays Including Ultrasonic Transducers

Devices described herein, in accordance with various embodiments, provide packaging of a two-dimensional array of ultrasonic transducers (e.g., an array of PMUTs). One or more embodiments are now described with reference to the drawings, wherein like reference numerals are used to refer to like elements throughout. In the following description, for purposes of explanation, numerous specific details are set forth in order to provide a thorough understanding of the various embodiments. It may be evident, however, that the various embodiments can be practiced without these specific details. In other instances, well-known structures and devices are shown in block diagram form in order to facilitate describing the embodiments in additional detail.

Piezoelectric materials facilitate conversion between mechanical energy and electrical energy. Moreover, a piezoelectric material can generate an electrical signal when subjected to mechanical stress, and can vibrate when subjected to an electrical voltage. Piezoelectric materials may be utilized in piezoelectric ultrasonic transducers to generate acoustic waves based on an actuation voltage applied to electrodes of the piezoelectric ultrasonic transducer.

A piezoelectric ultrasonic transducer able to generate and detect pressure waves can include a membrane with the piezoelectric material, a supporting layer, and electrodes combined with a cavity beneath the electrodes. Miniaturized versions known as PMUTs have been developed for a variety of medical and other ultrasound application.

PMUTs can be arranged into physical blocks with separately timed ultrasonic wave emission and detection. This advantageously reduces crosstalk issues and simplifies signal processing. In addition, because the fabrication of a PMUT through the Micro Electro Mechanical Systems (MEMS) process allows for repeatable variations of the hardware circuitry, supplemental modes may be supported through hardware. Supplemental modes may be supported through operation of the hardware in different modes through computer program code.

The systems described herein, in one or more embodiments thereof, relate to a PMUT array for ultrasonic wave generation and sensing. The PMUT devices include edge support structures and a membrane attached to the edge support structure to allow movement at ultrasonic frequencies. The membrane includes a piezoelectric layer, first and second electrodes at least partially attached to opposing sides of the piezoelectric layer. The membrane may optionally include an interior support structure connected to the piezoelectric layer within an area defined by the edge support structures. The PMUT devices can be arranged to form various virtual transmit and receive blocks on the two dimensional array. However, it should be appreciated that the described embodiments are not limited to PMUT devices, and that other types of ultrasonic transducers, such as CMUT devices, may be used.

In one embodiment, the PMUT array may form a fingerprint sensor system comprising a substrate having sidewalls to form a chamber fillable with an acoustic coupling material, also referred to herein as an ultrasound propagation material, such as an epoxy, polydimethylsiloxane (PDMS), perfluorotripentylamine (e.g., Fluorinert ™ FC-70), glass, metal, oil, gel, or various cyclic or linear siloxanes. In some embodiments, the acoustic coupling material has acoustic properties that act to minimize unwanted ultrasonic reflections at an interface between the acoustic coupling material and the cover. The PMUT array that transmits ultrasonic beams and receives ultrasonic signals is positioned in the chamber and a cover is positioned over the PMUT array to contain the ultrasound propagation material.

In some embodiments the acoustic coupling material is a gel material such as PDMS. The cover can be a platen directly touchable by a finger, allowing use under mobile device touchscreens, home buttons in mobile devices, or dedicated fingerprint sensor regions. Because ultrasonic systems can be tuned to penetrate intermediate layers, it is also possible to locate the PMUT in non-traditional locations for the mobile device. In certain embodiments, the cover can be a platen mounted on an edge of a mobile device and touchable by a finger, the cover can be on a curved area or region of a device, or the cover can be made of glass, metal, plastic, or composites among other materials and without limitation.

In various embodiments, the cover can include refractive acoustic elements, including ultrasonic lensing elements, acoustic wedges, focusing metamaterials, or microlenses. Similarly, PMUT devices (transducers) of the PMUT array can have affixed refractive acoustic elements, including ultrasonic lensing elements, acoustic wedges, focusing metamaterials, or microlenses. The refractive acoustic elements are used for refractive beamforming, e.g., to focus a transmit beam to a desired point. For instance, one or more refractive acoustic elements may be used to focus an ultrasonic signal to a point at or near the top of a platen (e.g., the contact point between a finger and a fingerprint sensing system. However, it should be appreciated that the refractive acoustic elements form a focal point at other depths (e.g., at a point above the platen for sensing into a finger rather than just the surface of the finger).

In various embodiments, a fingerprint sensor system includes a substrate having sidewalls to form a chamber fillable with an acoustic coupling material, and a PMUT array for transmitting ultrasonic beams and receiving ultrasonic signals positioned in the chamber. A cover is positioned over the PMUT array to contain the ultrasound propagation material. The cover or sidewalls of the PMUT array packaging include a relief mechanism (e.g. perforations or relief channels) for releasing acoustic coupling material when the cover is installed or mounted. The use of a relief mechanism simplifies use of the PMUT array as an under glass or under metal sensor system for mobile devices or other security applications.

In other embodiments, a fingerprint sensor system includes a cover having a varying thickness and including acoustic coupling material positioned over the PMUT array to contain the ultrasound propagation material. The cover can be curved to allow mounting as a platen mounted on an edge of a mobile device. In some embodiments, acoustic microlenses of varying sizes and arrangements can be subtractively or additively formed on the cover.

Other techniques known in ultrasound can be used to enhance propagation, or to deter losses of reflections, through any aberrating layers that are part of the device and through which the PMUT communicates with a finger. Beamforming, beam steering, and similar techniques for control of the PMUT may also be used to enhance further the capability of the PMUT with regard to a known device design and related packaging constraints.

Systems described herein can be used, for example, for analysis of acoustically sensed data in various applications, such as, but not limited to, medical applications, security systems, biometric systems (e.g., fingerprint sensors and/or motion/gesture recognition sensors), mobile communication systems, industrial automation systems, consumer electronic devices, robotics, etc. In one embodiment, the system can include PMUT devices that can facilitate ultrasonic signal generation and sensing (e.g., transducers). Moreover, the sensing component can include a silicon wafer having a two-dimensional (or one-dimensional) array of ultrasonic transducers.

In one embodiment, the PMUT array may be used in a substantially passive listening mode. In a typical active operational mode for fingerprint recognition, the PMUT elements are activated during a transmit phase in which an acoustic signal is generated. The reflected signal or echo is then received during a receive phase. The timing of the received reflection is used to construct a fingerprint image. Alternatively, in the presence of ambient external energy of suitable frequency, the PMUT array may be placed in a low-power listen mode that is substantially passive. Ambient signals are then received during a receive phase without the need to generate an acoustic signal during a transmit phase. This allows the device to consume substantially less power and to provide sensing capabilities other than ultrasonic fingerprint recognition.

In various embodiments, the ultrasonic transducers comprise PMUT devices. In various embodiments, the ultrasonic transducers comprise CMUT devices. In various embodiments, the control module comprises a processor.

Figure 14A:
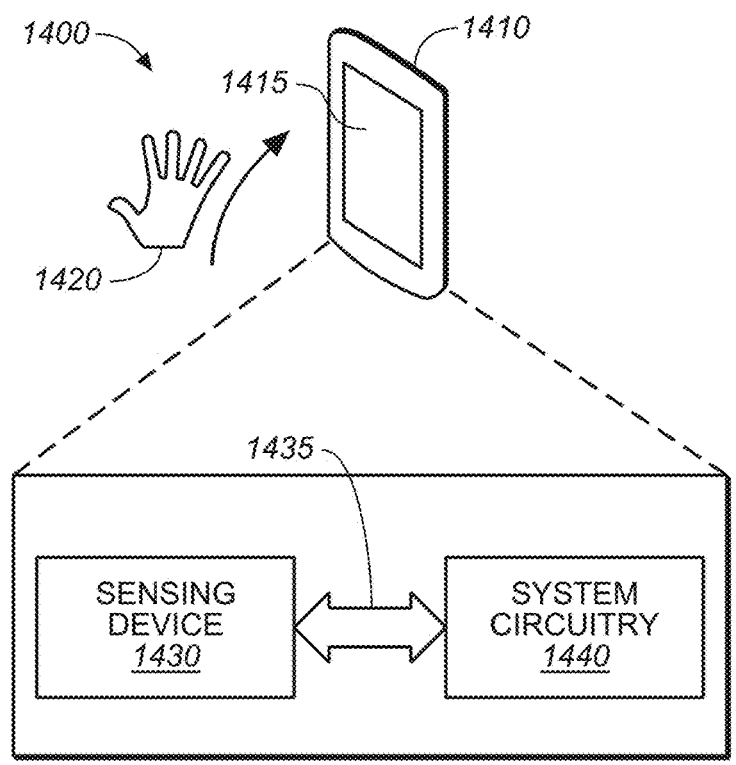
FIG. 14A illustrates an example of an operational environment for sensing of human touch, according to some embodiments.

With reference to the drawings, FIG. 14A illustrates an example of an operational environment 1400 for sensing of human touch in accordance with one or more embodiments of the disclosure. As illustrated, a device 1410 includes a fingerprint sensor 1430 or other type of surface sensitive to touch. In one embodiment, fingerprint sensor 1430 is disposed beneath a touch-screen display device 1415 of device 1410. In another embodiment, fingerprint sensor 1430 is disposed in an edge of device 1410. In another embodiment, fingerprint sensor 1430 is disposed adjacent or close to a touch-screen display device 1415 of device 1410. In another embodiment, fingerprint sensor 1430 is comprised within a touch-screen display device 1415 of device 1410. It should be appreciated that device 1410 includes a fingerprint sensor 1430 for sensing a fingerprint of a finger interacting with device 1410.

In one embodiment, a human finger (represented by a hand 1420), can touch or interact with a specific area of device 1410 proximate fingerprint sensor 1430. In various embodiments, fingerprint sensor 1430 can be hard and need not include movable parts, such as a sensor button configured to detect human touch or otherwise cause the device 1410 to respond to human touch. The device 1410 can include circuitry that can operate in response to touch (human or otherwise) of the touch-screen display device and/or fingerprint sensor 1430 (or, in some embodiments, another type of touch sensitive surface).

In accordance with the described embodiments, device 1410 includes sensing device 1430 and system circuitry 1440. It should be appreciated that components of sensing device 1430 and system circuitry 1440 might be disposed within the same componentry, and are conceptually distinguished herein such that fingerprint sensor 1430 includes components that are always-on, or mostly always-on, and system circuitry 1440 includes components that are powered off until they are powered on, for example, in response to an activation signal received from sensing device 1430. For example, such circuitry can be operatively coupled (e.g., electrically coupled, communicative coupled, etc.) via a bus architecture 1435 (or bus 1435) or conductive conduits configured to permit the exchange of signals between the sensing device 1430 and the system circuitry 1440. In some embodiments, a printed circuit board (PCB) placed behind a touch-screen display device can include the sensing device 1430, the system circuitry 1440, and the bus 1435. In one embodiment, the sensing device 1430 and the system circuitry 1440 can be configured or otherwise arranged in a single semiconductor die. In another embodiment, the sensing device 1430 can be configured or otherwise arranged in a first semiconductor die and the system circuitry 1440 can be configured or otherwise arranged in a second semiconductor die. In addition, in some embodiments, the bus 1435 can be embodied in or can include a dedicated conducting wire or a dedicated data line that connects the sensing device 1430 and the system circuitry 1440.

The sensing device 1430 can operate as sensor for human touch and the system circuitry 1440, or a portion thereof, can permit or otherwise facilitate analysis of the human touch. As described herein, sensing device 1430 includes fingerprint sensor 1430. For example, responsive to capturing an image of a fingerprint, fingerprint sensor 1430 can transmit the captured image to system circuitry for analysis.

The analysis can include fingerprint recognition or other types of biometric evaluations. The sensing device 1430 can be energized or otherwise power-on continuously or nearly continuously and can be configured to monitor touch of sensing device 1430. In addition, in response to human touch (e.g., touch by a human finger or other human body part), the sensing device 1430 can be further configured to trigger detection and/or another type of analysis of elements of the human touch or a human body associated therewith.

Figure 14B:
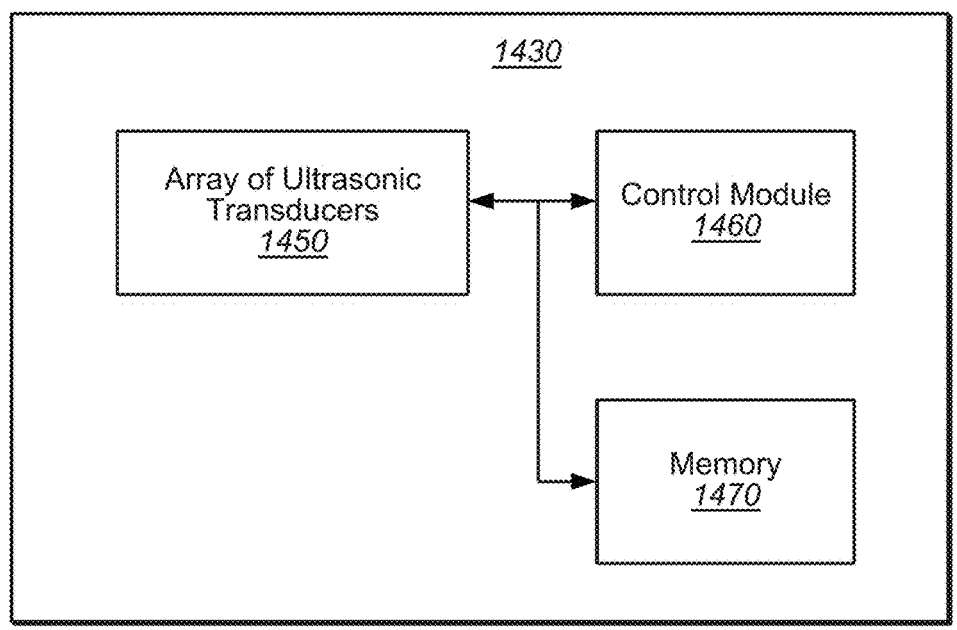
FIG. 14B illustrates an example sensing device, in accordance with various embodiments.

FIG. 14B illustrates an example sensing device 1430, in accordance with various embodiments. In one embodiment, sensing device 1430 includes an array 1450 of ultrasonic transducers (e.g., PMUT devices), a control module 1460, a memory 1470, and an external interface 1485. In various embodiments, control module 1460 performs certain operations in accordance with instructions stored within memory 1470. It should be appreciated that components of sensing device 1430 are examples, and that certain components, such as control module 1460 and/or memory 1470 may not be located within sensing device 1430 (e.g., control module 1460 and/or memory 1470 may reside within system circuitry 1440). For example, sensing device 1430 or system circuitry 1440 may include a processor and/or memory for performing certain operations.

In one embodiment, sensing device 1430 includes control module 1460 for performing the pixel capture. In other embodiments, control module 1460 can perform thresholding to determine whether an object has interacted with fingerprint sensor 1430. In other embodiments, control module 1460 can analyze captured pixels and determine whether the object is a finger. In other embodiments, control module 1460 can capture an image of the fingerprint and forward it to a processor of system circuitry 1440 for further analysis.

While the embodiment of FIG. 14B includes control module 1460 and memory 1470, as described above, it should be appreciated that various functions of control module 1460 and memory 1470 may reside in other components of device 1410 (e.g., within sensing device 1430 or system circuitry 1440). Moreover, it should be appreciated that control module 1460 may be any type of processor for performing any portion of the described functionality (e.g., custom digital logic).

In various embodiments, fingerprint sensor 1430 can include ultrasonic transducers (e.g., PMUTs or CMUTs) able to generate and detect pressure waves. Examples of PMUT devices and arrays of PMUT devices are described in accordance with FIGS. 1-13 above. In embodiments, a device 1410 includes sensing device 1430 comprised of an array of PMUT devices that can facilitate ultrasonic signal generation and sensing (transducer). For example, sensing device 1430 can include a silicon wafer having a two-dimensional (or one-dimensional) array of ultrasonic transducers.

Figure 15:
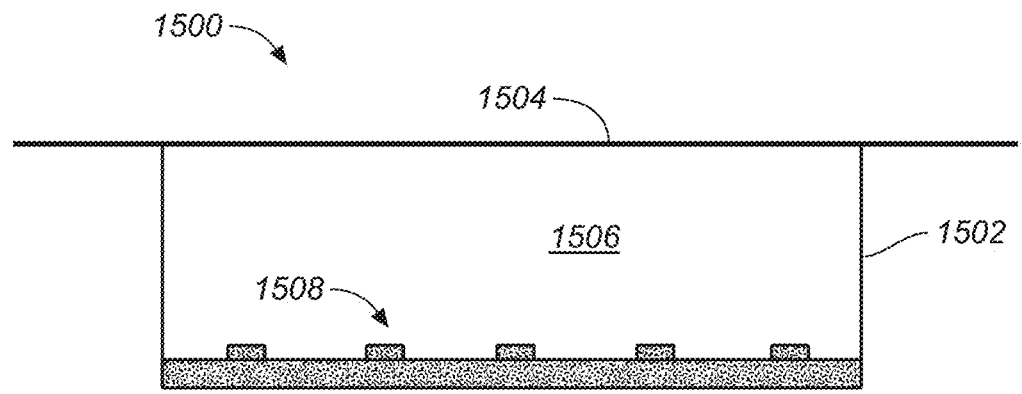
FIG. 15 illustrates an example array of ultrasonic transducers packaged in a chamber having a cover, in accordance with an embodiment.

FIG. 15 illustrates an example ultrasonic transducer array system 1500 including an array of ultrasonic transducers packaged in a chamber (also referred to herein as a cavity or a container) having a cover, in accordance with an embodiment. System 1500 includes sidewalls 1502 and a cover 1504 that, together with substrate mounted ultrasonic transducer array 1508, define a chamber. In one embodiment, array 1508 includes PMUTs. In another embodiment, array 1508, includes CMUTs.

The chamber is filled with an acoustic coupling material 1506, such as such as an epoxy, PDMS, perfluorotripentylamine (e.g., Fluorinert™ FC-70), glass, metal, oil, gel, or various cyclic or linear siloxanes. In various embodiments, the acoustic coupling material is selected to have acoustic matching properties with the cover 1504. In some embodiments, the acoustic coupling material 1506 has acoustic properties that act to minimize unwanted ultrasonic reflections at an interface between the acoustic coupling material 1506 and the cover. In some embodiments the cover 1504 can be directly used as a platen (e.g., platen 1216 of FIG. 12) for an ultrasonic fingerprint sensor, while in other embodiments the cover can be attached to a separate platen (not shown) that includes one or more additional material layers.

Figure 16:
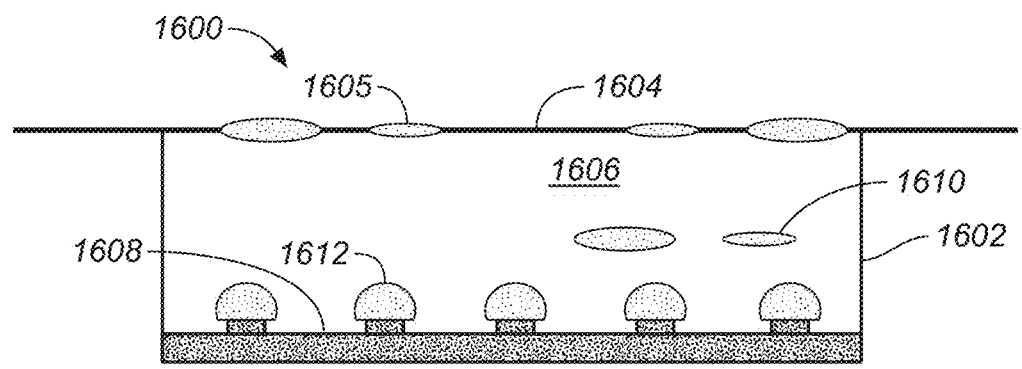
FIG. 16 illustrates an example array of ultrasonic transducers packaged in a chamber having a cover and including refractive acoustic elements, in accordance with an embodiment.

FIG. 16 illustrates an example ultrasonic transducer array system 1600 including an array of ultrasonic transducers packaged in a chamber having a cover and including refractive acoustic elements, in accordance with an embodiment. System 1600 includes sidewalls 1602 and a cover 1604 that, together with substrate mounted ultrasonic transducer array 1608, define a chamber. In one embodiment, array 1608 includes PMUTs. In another embodiment, array 1608 includes CMUTs.

The chamber is filled with an acoustic coupling material 1606, such as such as an epoxy, PDMS, perfluorotripentylamine (e.g., Fluorinert™ FC-70), glass, metal, oil, gel, or various cyclic or linear siloxanes. In various embodiments, the acoustic coupling material 1606 is selected to have acoustic matching properties with the cover 1604. In some embodiments, the acoustic coupling material 1606 has acoustic properties that act to minimize unwanted ultrasonic reflections at an interface between the acoustic coupling material and the cover. In some embodiments the cover 1604 can be directly used as a platen (e.g., platen 1216 of FIG. 12) for an ultrasonic fingerprint sensor, while in other embodiments the cover can be attached to a separate platen (not shown) that includes one or more additional material layers.

System 1600 also includes refractive acoustic elements. In some embodiments, system 1600 includes refractive acoustic elements 1605 that are attached to or disposed within cover 1604. In some embodiments, system 1600 includes refractive acoustic elements 1610 that are disposed within (e.g., suspended) acoustic coupling material 1606. In some embodiments, system 1600 includes refractive acoustic elements 1612 that are attached to or disposed adjacent to ultrasonic transducers of array 1608.

In accordance with various embodiments, the acoustic refractive elements 1605, 1610 and 1612 can be additively or subtractively formed, can be of various sizes, and can completely or partially match or be associated with ultrasonic transducers in the array 1608. For example, curved elements, lens elements, wedge elements, waveguides, or other geometric acoustic refractive elements can be used. Proper selection of material properties such as density, heterogeneous acoustic wave propagation characteristics, or anomalous acoustic wave propagation using metamaterials or the like can also be used to redirect ultrasonic signals. In certain embodiments, selected ultrasonic transducers in the array 1608 may only be used either for transmission or reception of ultrasonic signals, with type, size, and position of the acoustic refractive elements being selected to enhance efficiency of the system 1600. It should be appreciated that acoustic refractive elements 1605, 1610 and 1612 can be comprised of any material having different acoustic transmission properties than acoustic coupling material 1606.

The refractive acoustic elements are used for refractive beamforming, e.g., to focus a transmit beam to a desired point. For instance, one or more refractive acoustic elements may be used to focus an ultrasonic signal to a point at or near the top of a platen (e.g., the contact point between a finger and a fingerprint sensing system. However, it should be appreciated that the refractive acoustic elements form a focal point at other depths (e.g., at a point above the platen for sensing into a finger rather than just the surface of the finger). It should be appreciated that refractive acoustic elements may be located in various locations. For instance, refractive acoustic elements may be located in the cover, suspended in the acoustic coupling material, and/or adjacent to the array of ultrasonic transducers in any combination.

Figure 17:
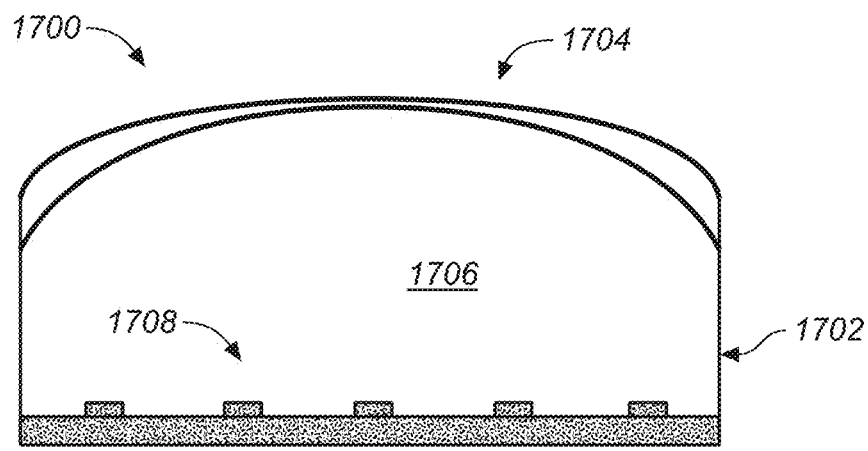
FIG. 17 illustrates an example array of ultrasonic transducers packaged in a chamber having a curved cover, in accordance with an embodiment.

FIG. 17 illustrates an example ultrasonic transducer array system 1700 including an array of ultrasonic transducers packaged in a chamber having a curved cover 1704, in accordance with an embodiment. Array system 1700 may be well suited, for example, for mounting on an edge of a device. System 1700 includes sidewalls 1702 and a cover 1704 that, together with substrate mounted ultrasonic transducer array 1708, define a chamber. In one embodiment, array 1708 includes PMUTs. In another embodiment, array 1708, includes CMUTs.

The chamber is filled with an acoustic coupling material 1706, such as such as an epoxy, PDMS, perfluorotripentylamine (e.g., Fluorinert™ FC-70), glass, metal, oil, gel, or various cyclic or linear siloxanes. In various embodiments, the acoustic coupling material is selected to have acoustic matching properties with the cover 1704. In some embodiments, the acoustic coupling material 1706 has acoustic properties that act to minimize unwanted ultrasonic reflections at an interface between the acoustic coupling material 1706 and the cover. In some embodiments the cover 1704 can be directly used as a platen (e.g., platen 1216 of FIG. 12) for an ultrasonic fingerprint sensor, while in other embodiments the cover can be attached to a separate platen (not shown) that includes one or more additional material layers.

Cover 1704 is curved such that acoustic coupling material 1706 is thicker at a midpoint of the array 1708 of ultrasonic transducers than towards an edge (e.g., towards a sidewall 1702) of the array 1708 of ultrasonic transducers. In one embodiment, cover 1704 has a varying thickness, with a greater thickness near the sidewalls 1702. This can allow for improvement in ultrasonic transducer efficiency for those ultrasonic transducers situated near the edge of array 1708. In some embodiments, an asymmetric phase delay pattern for edge situated ultrasonic transducers can be used, causing formation of an ultrasonic beam focused at a point above and outside the boundaries of the array 1708. In another embodiment, cover 1704 has a varying thickness, with a greater thickness near the center of array 1708, such that cover 1704 is thinner at a midpoint of the cover and thicker towards the sidewalls 1702. The acoustic refractive characteristics of cover 1704 can aid in detection of reflected ultrasonic signals from that focal point outside the boundaries of the array.

FIGS. 18A-C illustrate example packaging configurations including relief mechanisms, in accordance with various embodiments. As illustrated in FIG. 18A, a package 1800 for ultrasonic transducer array system 1805 includes a cover 1802 having a relief channel 1804 to allow expulsion of excess acoustic coupling material contained in a cavity. In accordance with various embodiments, the relief channel 1804 can be a groove defined or etched in either or both the cover and top of the sidewalls 1806. In the illustrated embodiment, four relief channels situated at corners of the sidewalls are shown. However, it should be appreciated that the relief channels may be located in different positions or greater or lesser numbers of relief channels can be used.

In various embodiments, during manufacture, the cavity is first filled with the acoustic coupling material. Cover 1802 is then placed atop sidewalls 1806. Excess acoustic coupling material may be expelled via relief channels 1804, for example, as a result of cover 1802 being placed or during curing of the acoustic coupling material that might result in expansion of the acoustic coupling material. It should be appreciated that in accordance with various embodiments, after fixing the cover 1802 in place, or upon completion or partial completion of curing of the acoustic coupling material, relief channels 1804 can be sealed with a suitable epoxy or similar adhesive.

Similarly, FIG. 18B illustrates a package 1810 for ultrasonic transducer array system 1815 that includes a cover 1812 having at least one relief channel 1814 to allow expulsion of excess acoustic coupling material contained in a cavity. In one embodiment, relief channels 1814 are vertically etched into cover 1812. In accordance with various embodiments, the relief channel 1814 can be a hole or opening in cover 1812. In the illustrated embodiment, four relief channels 1814 situated at corners of cover 1812. However, it should be appreciated that the relief channels may be located in different positions or greater or lesser numbers of relief channels can be used.

In various embodiments, during manufacture, the cavity is first filled with the acoustic coupling material. Cover 1812 is then placed atop sidewalls 1816. Excess acoustic coupling material may be expelled via relief channels 1814, for example, as a result of cover 1812 being placed or during curing of the acoustic coupling material that might result in expansion of the acoustic coupling material. It should be appreciated that in accordance with various embodiments, after fixing the cover 1812 in place, or upon completion or partial completion of curing of the acoustic coupling material, relief channels 1814 can be sealed with a suitable epoxy or similar adhesive.

In yet another embodiment shown in FIG. 18C, package 1820 for ultrasonic transducer array system 1825 includes a cover 1822 and a relief channel 1824 situated in the sidewall 1826 of the package 1820 to allow expulsion of excess acoustic coupling material contained in a cavity. In accordance with various embodiments, the relief channel 1824 can be an opening in sidewall 1826. In the illustrated embodiment, four relief channels 1824 situated at midpoints of sidewalls 1826 are shown. However, it should be appreciated that the relief channels may be located in different positions or greater or lesser numbers of relief channels can be used.

In various embodiments, during manufacture, the cavity is first filled with the acoustic coupling material. Cover 1822 is then placed atop sidewalls 1826. Excess acoustic coupling material may be expelled via relief channels 1824, for example, as a result of cover 1822 being placed or during curing of the acoustic coupling material that might result in expansion of the acoustic coupling material. It should also be appreciated that multiple packages 1820 may be arranged adjacently, such that acoustic coupling material flows through multiple packages 1820, such that excess acoustic coupling material is expelled from all packages via relief channels 1824 of outer packages 1820. It should be appreciated that in accordance with various embodiments, after fixing the cover 1822 in place, or upon completion or partial completion of curing of the acoustic coupling material, relief channels 1824 can be sealed with a suitable epoxy or similar adhesive.

In various embodiments, the use of relief channel(s) allows fingerprint sensors using ultrasonic transducer arrays to be filled with acoustic coupling material just prior to attachment to a fingerprint sensor platen. Alternatively, edge mounted sensors with curved glass or metal covers can be more easily assembled. In some embodiments, mobile computers or telecommunication devices that include touchscreen glass or plastic display device can have a fingerprint sensor assembled under the display device, with acoustic coupling material (e.g., gel) being injected into the cavity through the grooves, perforations, or channels after attachment.

FIGS. 19A-D illustrate example mobile devices including an array of ultrasonic transducers in various locations, in accordance with various embodiments. As illustrated in FIGS. 19A-D, example mobile devices that incorporate a ultrasonic transducer array in non-traditional locations are shown. Non-traditional placement is possible because ultrasonic transducers can be tuned to penetrate intermediate layers, which are layers that reside between the sensor (e.g., ultrasonic transducer array) and the element sensed (e.g., a finger). There are limitations with alternative fingerprint sensing technologies. Optical-based detection requires line-of-sight between the sensor and the sensed element. Any intermediate layer must be optically transparent, so most opaque materials are not a packaging option. Capacitive-based detection requires line-of-touch between the sensor and element sensed. Any intermediate layer is part of the electrical circuit and places limitations on the material choice of the packaging and the use of non-planar designs.

Figure 19A:
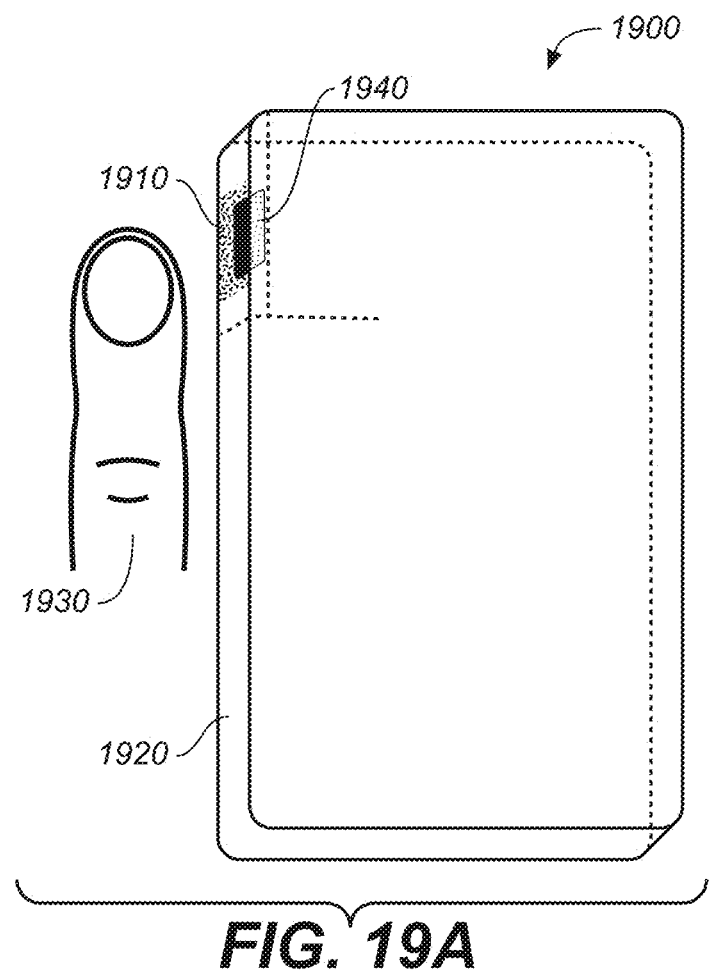
FIGS. 19A-D illustrate example mobile devices including an array of ultrasonic transducers in various locations, in accordance with various embodiments.
Figure 19B:
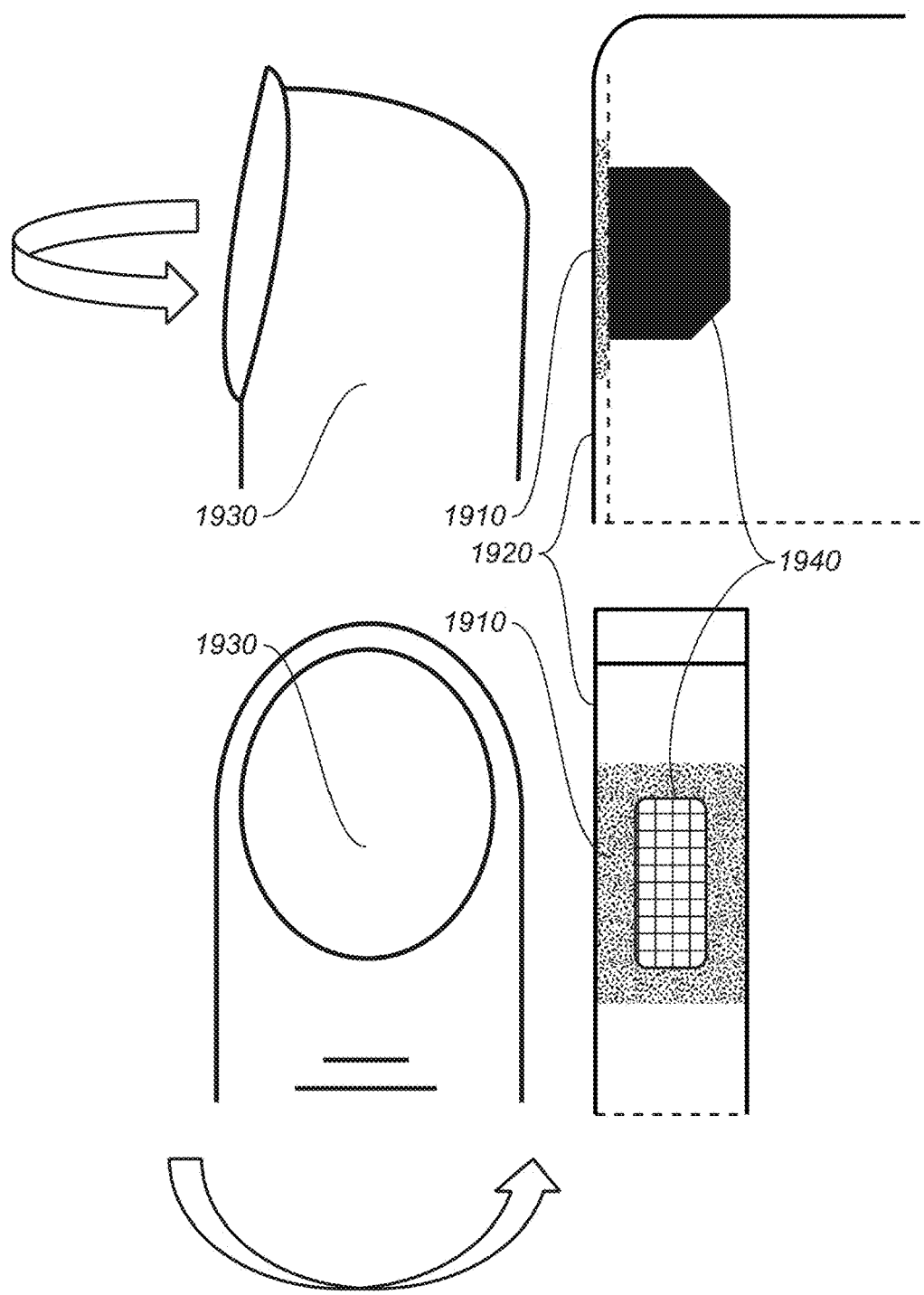

Accordingly, it is possible to locate the array of ultrasonic transducers in non-traditional locations for the mobile device. FIG. 19A shows an example mobile device 1900 where the cover 1910 can be a platen mounted on an edge 1920 of mobile device 1900 and touchable by a finger 1930. In one embodiment, edge 1920 is perpendicular to a top surface (e.g., the surface with the display device) of mobile device 1900. In the present embodiment, ultrasonic transducer array system 1940 has a rectangular layout with substantially more columns than rows, so that mobile device 1900 can be as thin as possible while still providing sufficient area for the device to provide acceptable fingerprint recognition. FIG. 19B shows a close-up of mobile device 1900 and ultrasonic transducer array system 1940, where edge 1920 is planar, or substantially planar.

Figure 19C:
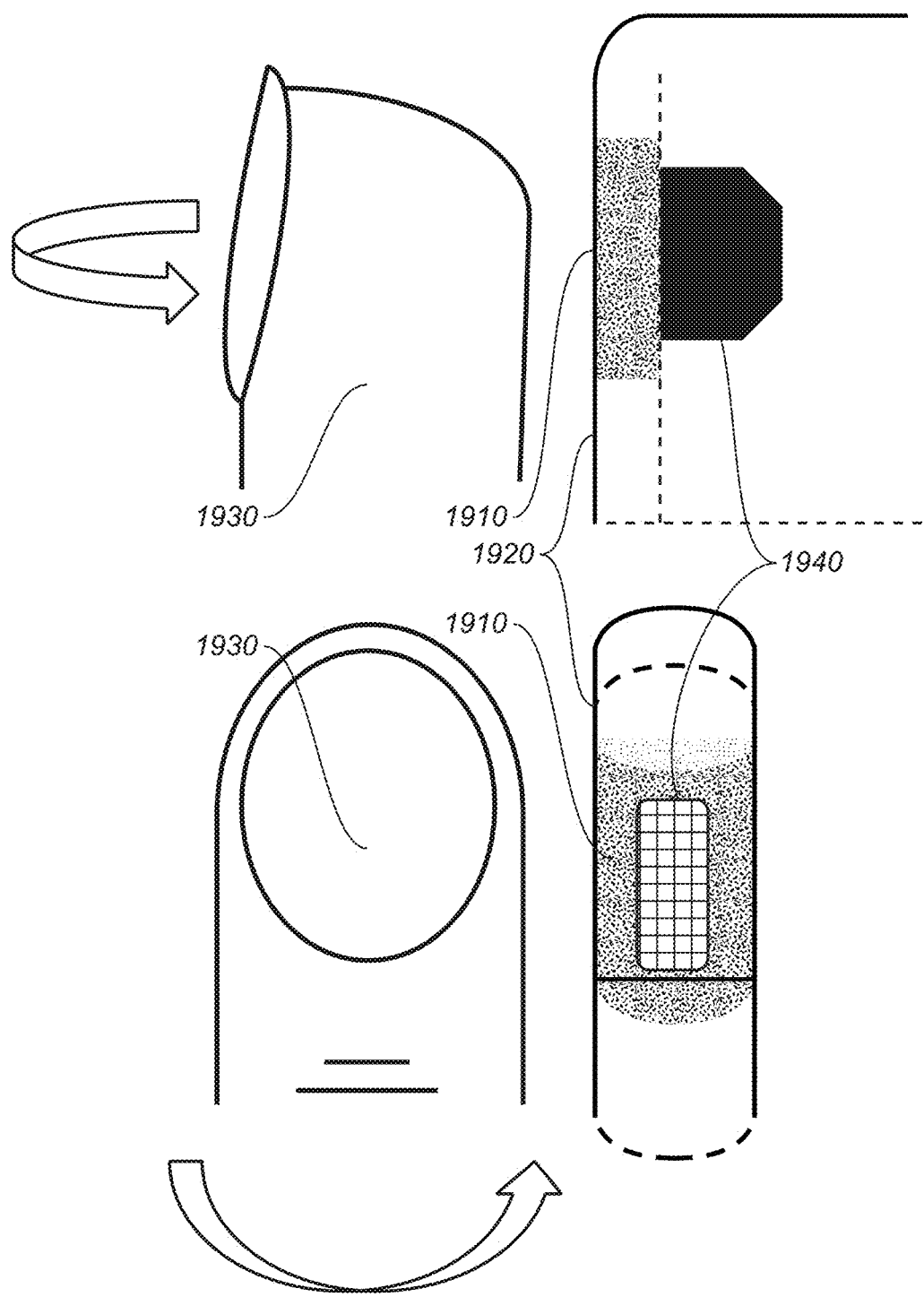

FIG. 19C shows a close-up of mobile device 1900 and ultrasonic transducer array system 1940 where edge 1920 is curved. As illustrated, edge 1920 is a curved surface having a curvature, such that a surface of ultrasonic transducer array system 1940 is curved to match the curvature of the curved surface. In one embodiment, the acoustic coupling layer of ultrasonic transducer array system 1940 is curved to match the curvature of the curved surface. In another embodiment, the cover and/or platen of ultrasonic transducer array system 1940 is curved to match the curvature of the curved surface.

Figure 19D:
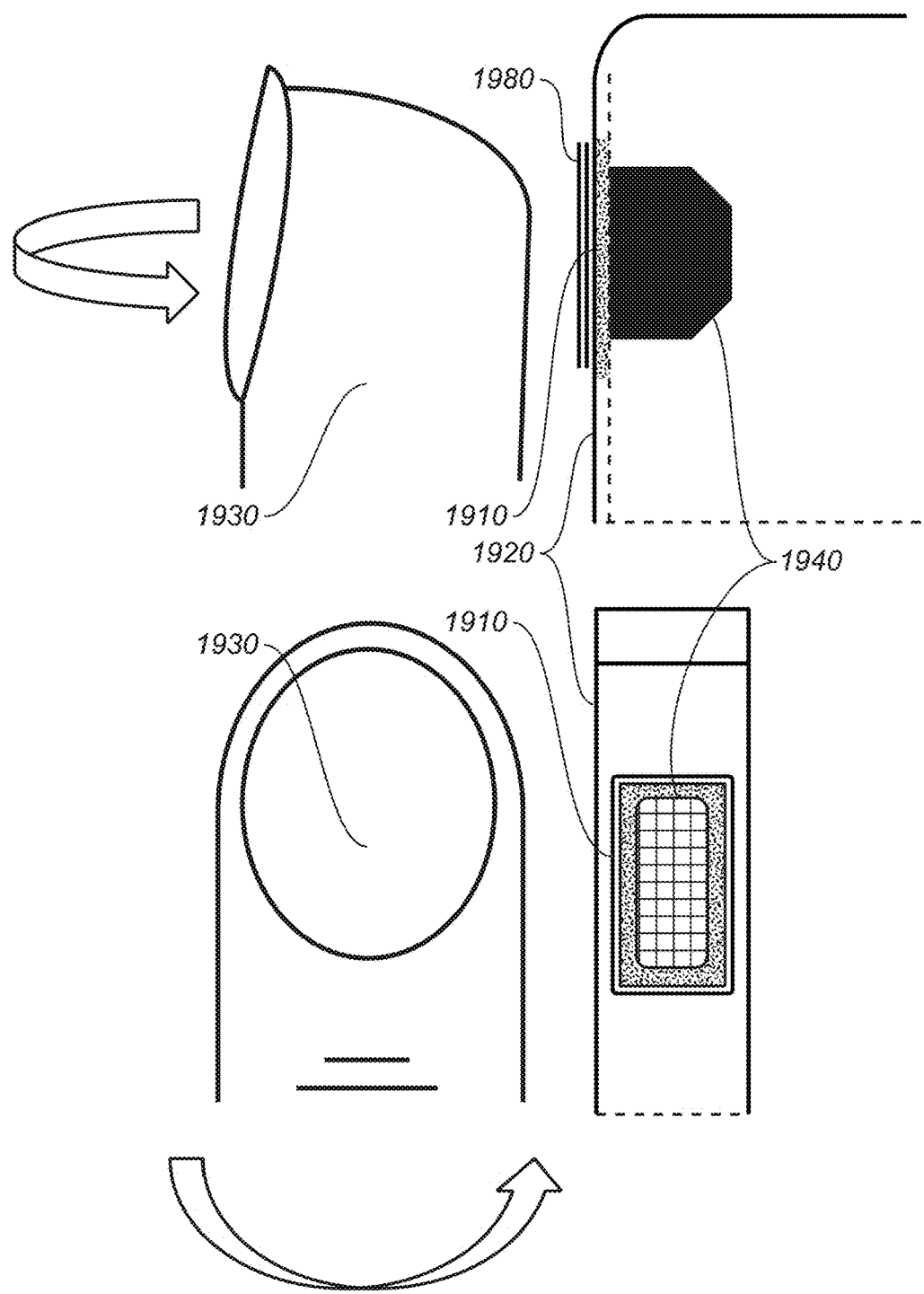

FIG. 19D shows a close-up of mobile device 1900 and ultrasonic transducer array system 1940 where ultrasonic transducer array system 1940 is incorporated beneath a physical button 1980 that is disposed in edge 1920. In one embodiment, physical button 1980 is proximate to cover 1910. In another embodiment, physical button 1980 is cover 1910.

It will be appreciated that the cover or platen can be made of glass, metal, plastic, or composites among other materials. Other techniques known in ultrasound can be used to enhance propagation, or to deter losses of reflections, through any such intermediate or aberrating layers that are part of the device and through which the ultrasonic transducers communicate with a finger. Beamforming, beam steering, and similar techniques for control of the ultrasonic transducers may also be used to enhance further the capability of the ultrasonic transducers with regard to a known device design and related packaging constraints. It will be appreciated that the mobile device may be any portable computing device such as a smart phone, tablet computer, laptop computer, or wearable device. It is also possible to apply the invention to other security applications—unlocking traditional doors or vehicle doors, lock box, ATM or other security access, etc.

What has been described above includes examples of the subject disclosure. It is, of course, not possible to describe every conceivable combination of components or methodologies for purposes of describing the subject matter, but it is to be appreciated that many further combinations and permutations of the subject disclosure are possible. Accordingly, the claimed subject matter is intended to embrace all such alterations, modifications, and variations that fall within the spirit and scope of the appended claims.

In particular and in regard to the various functions performed by the above described components, devices, circuits, systems and the like, the terms (including a reference to a "means") used to describe such components are intended to correspond, unless otherwise indicated, to any component which performs the specified function of the described component (e.g., a functional equivalent), even though not structurally equivalent to the disclosed structure, which performs the function in the herein illustrated exemplary aspects of the claimed subject matter.

The aforementioned systems and components have been described with respect to interaction between several components. It can be appreciated that such systems and components can include those components or specified sub-components, some of the specified components or sub-components, and/or additional components, and according to various permutations and combinations of the foregoing. Sub-components can also be implemented as components communicatively coupled to other components rather than included within parent components (hierarchical). Additionally, it should be noted that one or more components may be combined into a single component providing aggregate functionality or divided into several separate sub-components. Any components described herein may also interact with one or more other components not specifically described herein.

In addition, while a particular feature of the subject innovation may have been disclosed with respect to only one of several implementations, such feature may be combined with one or more other features of the other implementations as may be desired and advantageous for any given or particular application. Furthermore, to the extent that the terms "includes," "including," "has," "contains," variants thereof, and other similar words are used in either the detailed description or the claims, these terms are intended to be inclusive in a manner similar to the term "comprising" as an open transition word without precluding any additional or other elements.

Thus, the embodiments and examples set forth herein were presented in order to best explain various selected embodiments of the present invention and its particular application and to thereby enable those skilled in the art to make and use embodiments of the invention. However, those skilled in the art will recognize that the foregoing description and examples have been presented for the purposes of illustration and example only. The description as set forth is not intended to be exhaustive or to limit the embodiments of the invention to the precise form disclosed.

What is claimed is:

1. An electronic device comprising:
   an array of ultrasonic transducers for generating and receiving ultrasonic signals;
   an acoustic coupling layer overlying the array of ultrasonic transducers, wherein the ultrasonic signals are propagated through the acoustic coupling layer; and
   a cover overlying the acoustic coupling layer, wherein the cover has varying thickness.

2. The electronic device of claim 1, wherein the ultrasonic transducers comprise Piezoelectric Micromachined Ultrasonic Transducer (PMUT) devices.

3. The electronic device of claim 1, wherein the ultrasonic transducers comprise Capacitive Micromachined Ultrasonic Transducer (CMUT) devices.

4. The electronic device of claim 1, wherein the cover is curved such that the acoustic coupling layer is thicker at a midpoint of the array of ultrasonic transducers than towards an edge of the array of ultrasonic transducers.

5. The electronic device of claim 1, wherein the cover has varying thickness such that the cover is thinner at a midpoint of the cover and thicker towards an edge of the cover.

6. The electronic device of claim 1 further comprising:
sidewalls bounding the array of ultrasonic transducers and the acoustic coupling layer.

7. The electronic device of claim 1 further comprising:
a plurality of refractive acoustic elements.

8. The electronic device of claim 7, wherein the plurality of refractive acoustic elements are disposed within the acoustic coupling layer such that a refractive acoustic element of the plurality of refractive acoustic elements is associated with an ultrasonic transducer of the array of ultrasonic transducers.

9. The electronic device of claim 8, wherein the plurality of refractive acoustic elements are disposed adjacent to the array of ultrasonic transducers.

10. The electronic device of claim 7 further comprising a cover, wherein the plurality of refractive acoustic elements are disposed within the cover such that a refractive acoustic element of the plurality of refractive acoustic elements is associated with an ultrasonic transducer of the array of ultrasonic transducers.

11. An electronic device comprising:
an array of ultrasonic transducers for generating and receiving ultrasonic signals;
sidewalls bounding the array of ultrasonic transducers;
an acoustic coupling layer overlying the array of ultrasonic transducers and bounded by the sidewalls, wherein the ultrasonic signals are propagated through the acoustic coupling layer, the acoustic coupling layer comprising an acoustic material supporting transmission of the ultrasonic signals; and
a cover overlying the sidewalls and the acoustic coupling layer;
wherein the sidewalls comprise a relief channel for allowing expulsion of excess acoustic material of the acoustic coupling layer from a cavity defined by the array of ultrasonic transducers, the sidewalls and the cover.

12. The electronic device of claim 11, wherein the relief channel is a groove situated at a top edge of the sidewalls.

13. The electronic device of claim 11, wherein the relief channel is an opening situated within the sidewalls.

14. The electronic device of claim 11, wherein the cover comprises a second relief channel for allowing expulsion of excess acoustic material of the acoustic coupling layer from the cavity defined by the array of ultrasonic transducers, the sidewalls and the cover.

15. A mobile device comprising:
a processor;
a memory unit;
a display device disposed on a first surface of the mobile device; and
a fingerprint sensor disposed on a second surface of the mobile device, wherein the second surface is a curved surface having a curvature, such that the fingerprint sensor is curved to match the curvature of the curved surface, the fingerprint sensor comprising:
an array of ultrasonic transducers for generating and receiving ultrasonic signals; and
an acoustic coupling layer overlying the array of ultrasonic transducers, wherein the ultrasonic signals are propagated through the acoustic coupling layer.

16. The mobile device of claim 15, wherein the ultrasonic transducers comprise Piezoelectric Micromachined Ultrasonic Transducer (PMUT) devices.

17. The mobile device of claim 15, wherein the ultrasonic transducers comprise Capacitive Micromachined Ultrasonic Transducer (CMUT) devices.

18. The mobile device of claim 15, wherein the second surface is perpendicular to the first surface.

19. The mobile device of claim 15, wherein the acoustic coupling layer of the fingerprint sensor is curved to match the curvature of the curved surface.

20. The mobile device of claim 15, wherein the fingerprint sensor further comprises a cover overlying the acoustic coupling layer, wherein the cover is curved to match the curvature of the curved surface.

21. The mobile device of claim 20, wherein the cover has varying thickness such that the cover is thinner at a midpoint of the cover and thicker towards an edge of the cover.

22. The mobile device of claim 15, wherein the first surface is a top surface of the mobile device and the second surface is a bottom surface of the mobile device.

23. The mobile device of claim 15, wherein the fingerprint sensor comprises a button overlying the acoustic coupling layer such that the button is disposed on the second surface.

* * * * *